US012681577B2

(12) United States Patent
Gallacher et al.

(10) Patent No.: US 12,681,577 B2
(45) Date of Patent: Jul. 14, 2026

(54) APPARATUS AND METHOD FOR TRACKING MOTION AND PROVIDING HAPTIC FEEDBACK

(71) Applicant: Haply Robotics, Inc., Montreal (CA)

(72) Inventors: Colin Gallacher, San Diego, CA (US); Felix Desourdy, Montreal (CA); Oliver Philbin-Briscoe, Westmount (CA); Antoine Weill-Duflos, Verdun (CA); Maciej Lacki, Montreal (CA); Nicholas Ong, Lititz, PA (US); Jessica Henry, Montreal (CA); Yi Ding, Montreal (CA)

(73) Assignee: Haply Robotics, Inc., Montreal (CA)

( * ) Notice: Subject to any disclaimer, the term of this patent is extended or adjusted under 35 U.S.C. 154(b) by 196 days.

(21) Appl. No.: 18/025,207

(22) PCT Filed: Sep. 8, 2021

(86) PCT No.: PCT/IB2021/000644
§ 371 (c)(1),
(2) Date: Mar. 8, 2023

(87) PCT Pub. No.: WO2022/053873
PCT Pub. Date: Mar. 17, 2022

(65) Prior Publication Data
US 2023/0315206 A1      Oct. 5, 2023

Related U.S. Application Data

(60) Provisional application No. 63/231,451, filed on Aug. 10, 2021, provisional application No. 63/229,098, (Continued)

(51) Int. Cl.
*G06F 3/01* (2006.01)
*F16M 11/04* (2006.01)
(Continued)

(52) U.S. Cl.
CPC .......... *G06F 3/016* (2013.01); *F16M 11/041* (2013.01); *F16M 11/18* (2013.01);
(Continued)

(58) Field of Classification Search
CPC ...... F16M 11/18; F16M 11/048; F16M 11/38; F16M 11/2078; F16M 11/041;
(Continued)

(56) References Cited

U.S. PATENT DOCUMENTS 6,879,315 B2      4/2005   Guy et al.
9,895,812 B2      2/2018   Gonzalez et al.
(Continued)

FOREIGN PATENT DOCUMENTS

WO          2018051383 A1      3/2018

OTHER PUBLICATIONS

International Search Report for PCT/IB2021/000644; mailed Jan. 10, 2022.
(Continued)

*Primary Examiner* — Yaron Cohen
(74) *Attorney, Agent, or Firm* — Black McCuskey

(57)          ABSTRACT

An apparatus for augmented and virtual reality systems can include a mount, a base, a linkage, a linkage sensor, and a receiver assembly. The mount can releasably attach to an anchor structure. The base can be adjustably engaged or fixedly engaged with the mount. The linkage can be adjustably engaged with the base. The linkage sensor can sense the orientation of the linkage relative to the base. The receiver assembly can receive a tool.

2 Claims, 23 Drawing Sheets

Related U.S. Application Data filed on Aug. 4, 2021, provisional application No. 63/228,976, filed on Aug. 3, 2021, provisional application No. 63/203,028, filed on Jul. 6, 2021, provisional application No. 63/075,577, filed on Sep. 8, 2020.

(51) Int. Cl.

| | |
|---|---|
| *F16M 11/18* | (2006.01) |
| *F16M 11/20* | (2006.01) |
| *F16M 11/38* | (2006.01) |
| *G06F 3/0346* | (2013.01) |

(52) U.S. Cl.
CPC ......... *F16M 11/2078* (2013.01); *F16M 11/38* (2013.01); *G06F 3/011* (2013.01); *G06F 3/0346* (2013.01); *F16M 2200/022* (2013.01); *F16M 2200/063* (2013.01)

(58) Field of Classification Search
CPC ............. F16M 11/2014; F16M 11/046; F16M 2200/022; F16M 2200/063; F16M 13/022; G06F 3/016; G06F 3/0346; G06F 3/011
See application file for complete search history.

(56) References Cited

U.S. PATENT DOCUMENTS

| | | | |
|---|---|---|---|
| 9,895,912 | B1 | 2/2018 | Gonzalez |
| 10,178,157 | B2 | 1/2019 | Avisar |
| 10,198,086 | B2 | 2/2019 | Parazynski et al. |
| 10,437,339 | B2 | 10/2019 | Banerjee et al. |
| 2002/0011544 | A1* | 1/2002 | Bosson ................ F16M 11/041 |
| | | | 248/274.1 |
| 2004/0003428 | A1 | 1/2004 | Hirochika et al. |
| 2006/0205565 | A1* | 9/2006 | Feldman ................ A63B 23/12 |
| | | | 482/8 |
| 2016/0026253 | A1 | 1/2016 | Bradski et al. |
| 2017/0014067 | A1 | 1/2017 | Peppou et al. |
| 2018/0025008 | A1 | 1/2018 | Tan et al. |
| 2019/0042004 | A1* | 2/2019 | Parazynski ............ G05G 9/047 |

OTHER PUBLICATIONS

Written Opinion of the International Search Authority for PCT/IB2021/000644; mailed Jan. 20, 2022.
European Patent Office, Extended European Search Report filed in the corresponding European application No. 21866155.1, dated Nov. 18, 2024, 9 pages.

\* cited by examiner

APPARATUS AND METHOD FOR TRACKING MOTION AND PROVIDING HAPTIC FEEDBACK

CROSS-REFERENCE TO RELATED APPLICATIONS

This application is a National Phase application of International Application No. PCT/M2021/000644, for an APPARATUS AND METHOD FOR TRACKING MOTION AND PROVIDING HAPTIC FEEDBACK, filed Sep. 8, 2021, which claimed the benefit of U.S. Provisional Patent Application Ser. No. 63/075,577 for a Desktop Haptic Device for improved versatility in virtual and augmented reality, filed on Sep. 8, 2020; and claimed the benefit of U.S. Provisional Patent Application Ser. No. 63/203,028 for a Mechanical Structure and Gimbal System to Facilitate Reconfiguration for Portability of a Robotic Device Compatible with Force-Feedback Operation, filed on Jul. 6, 2021; and claimed the benefit of U.S. Provisional Patent Application Ser. No. 63/228,976 for a physical simulation system and method to facilitate training of medical workers, filed on Aug. 3, 2021; and claimed the benefit of U.S. Provisional Patent Application Ser. No. 63/229,098 for a physical simulation system and method to facilitate training of medical workers, filed on Aug. 4, 2021; and claimed the benefit of U.S. Provisional Patent Application Ser. No. 63/231,451 for a Desktop Haptic Device for improved versatility in virtual and augmented reality, filed on Aug. 10, 2021, which are hereby incorporated by reference in their entireties.

BACKGROUND

1. Field

The present disclosure relates to input arrangements with position and orientation sensing and force or tactile feedback as computer generated output to the user, such as found in CPC G06F 3/011.

2. Description of Related Prior Art

U.S. Pat. No. 10,437,339 discloses a METHOD AND SYSTEM FOR SIMULATING SURGICAL PROCEDURES. The technology relates to systems, methods and devices for haptically-enabled virtual reality simulation of cerebral aneurysm clipping, wherein a user uses two physical stations during the simulation. The first station is a haptic and augmented reality station, and the second station is a haptic and virtual reality station.

U.S. Pub. No. 2016/0026253 discloses METHODS AND SYSTEMS FOR CREATING VIRTUAL AND AUGMENTED REALITY. Configurations are disclosed for presenting virtual reality and augmented reality experiences to users. The system may comprise an image capturing device to capture one or more images, the one or more images corresponding to a field of the view of a user of a head-mounted augmented reality device, and a processor communicatively coupled to the image capturing device to extract a set of map points from the set of images, to identify a set of sparse points and a set of dense points from the extracted set of map points, and to perform a normalization on the set of map points.

U.S. Pat. No. 6,879,315 discloses a Force reflecting haptic interface. A six degree of freedom force reflecting haptic interface includes three powered axes and three free axes, all of which are tracked so that the position of a user connection element in the work volume can be determined. The interface includes cable drives with polymer composite or metallic cables, automatic cable tensioning devices, and grounded actuator capstans. A nested hub and transfer drive provide a compact, weight balanced interface. User comfort and safety features are also provided.

U.S. Pub. No. 20040034283 discloses a System and method for interactive haptic positioning of a medical device. A combination of a haptic device and a computer-assisted medical system is used for interactive haptic positioning of a medical device coupled to the haptic device. A reconfigurable haptic object facilitates the positioning of the medical device and/or the haptic device. The haptic object may be modified in response to application of a force against the haptic object by a user of the haptic device pushing the haptic device against the haptic object. Preferably, the haptic object moves in the direction of the force applied by the haptic device. The medical device may be guided to a desired pose relative to a target area from its current position. The user may approach the target area from its current position and still be provided with haptic cues to enable the user to guide the medical device to the target area.

U.S. Pat. No. 9,895,812 discloses a control device with multidirectional force feedback. A control device with force feedback including: a handle operated by a user, the handle including a grab area for taking hold by the user and a contact end secured to the grab area during at least part of operation of the control device; a robot including a terminal body including a contact area which can come into contact with the contact end; a mechanism measuring relative configuration of the handle and the terminal body; a controller controlling movement of the contact area relative to the contact end; the contact end being movable relative to the contact area during at least part of the operation of the control device, and the contact end and the contact area are shaped such that the robot applies to the handle a force feedback in at least two separate directions during at least part of the operation of the control device.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An apparatus can comprise a mount, a base, a linkage, at least one linkage sensor, and a receiver assembly. The mount can be configured to releasably attach or fixedly attach to an anchor structure. The linkage can be movably engaged with the base whereby a first orientation of the linkage relative to the base is adjustable. The at least one linkage sensor can be disposed to sense the first orientation of the linkage relative to the base. The receiver assembly can receive a tool.

According to other features, the mount can be further defined as including one of a clamp, one or more suction cups, and adhesive for releasably attaching to the anchor structure. One of the mount and the base can further comprise a first ball and the other of the mount and the base further can further comprise a first socket receiving the first ball. One of the mount and the base further comprises a lock that can be configured to selectively fix the first ball and the first socket with respect to one another.

In other features, the base can further comprise a first portion that can directly engage the mount. The base can further comprise a second portion that can be positioned between the linkage and the first portion. The first portion of the base and the second portion of the base can be rotatable relative to one another about a first axis. The base can further comprise at least one head orientation sensor disposed to sense an angular position of the first portion relative to the second portion.

According to additional features, the linkage can further comprise a first link. The linkage can further comprise a second link engaged with the first link for relative pivoting movement about a first axis. The linkage can further comprise a third link engaged with the second link for relative pivoting movement about a second axis. The linkage can further comprise a fourth link engaged with the third link for relative pivoting movement about a third axis. The first link and the fourth link can both be disposed for rotational movement about a fourth axis or can be disposed for rotational movement about respective, spaced fourth and fifth axes.

According to other features, the apparatus can further comprise a lock that can be selectively engageable and operably disposed between the third link and the fourth link. When engaged, the lock can limit a first angle between the third link and the fourth link to less than one hundred and eighty degrees and can also limit a second angle between the first link and the second link to less than one hundred and eighty degrees. The first link and the fourth link can extend symmetrically to one another and the second link and the third link can extend symmetrically to one another. When the lock is disengaged relative to the third link and the fourth link, the first link and the second link can be pivotally moveable relative to one another greater than one hundred and eighty degrees and, also, the third link and the fourth link are pivotally moveable relative to one another no more than one hundred and eighty degrees.

In other features, the lock can further comprise a stop having a distal tip. The stop can be pivotally mounted on a first of the third link and the fourth link about a pivot axis for pivoting movement between an operating position and a retracted position. The lock can further comprise a biasing device mounted on the first of the third link and the fourth link. The biasing device can bias the stop to the operating position. A second of the third link and the fourth link can further comprise an engaging surface that comes into contact with the distal tip when the stop is in the operating position and before the third link and the fourth link pivot to one hundred and eighty degrees relative to one another. The distal tip can be moved out of a path of the engaging surface when the stop is pivoted to the retracted position whereby the third link and the fourth link are then operable to pivot to at least one hundred and eighty degrees relative to one another.

According to additional features, the apparatus can further comprise a lock that is selectively engageable and operably disposed between the base and the linkage, wherein, when engaged, the lock can prevent relative movement between the base and at least a portion of the linkage. The linkage can further comprise a plurality of links that are pivotally connected to one another, including at least one link that can be at least partially transparent.

According to other features, the receiver assembly can be rotatable relative to the linkage about a first axis and can further comprise a first arm fixed to the body of the receiver assembly. The receiver assembly can further comprise a second arm connected to the body of the receiver assembly for pivoting movement about a second axis between an operating position and a retracted position. At least part of the one of the male and female connecting portion can be positioned on the second arm. The first axis and the second axis can be collinear.

In other features, the receiver assembly can be rotatable relative to the linkage about a first axis and the one of the male and female connecting portion can further comprise at least a portion of one of a concave surface and a convex surface configured to engage the tool in a ball and socket joint. The receiver assembly can further comprise a biasing device that can bias the second arm to the operating position. The biasing device can include at least one of a magnet and a spring.

According to additional features, the base can further comprise a body portion and a head portion that are rotatable relative to one another about a first axis. At least part of the linkage can rotate in a first plane and the first axis extends parallel to the first plane.

According to other features, the linkage can be rotatable about a first axis and can further comprise a plurality of links. The one of the male and female connecting portion can be offset from the linkage such that a plane containing at least two of the plurality of links, normal to the first axis, and closest to the one of the male and female connecting portion is at least thirty millimeters from a center of the one of the male and female connecting portion.

In other features, the base can include a head portion and a body portion rotatably engaged with one another. The linkage can include a plurality of links. The apparatus can further comprise a first shaft interconnecting the head portion and a first link of the linkage for relative pivoting movement. The apparatus can further comprise a second shaft interconnecting the head portion and a second link of the linkage for relative pivoting movement. The apparatus can further comprise a third shaft interconnecting the head portion and the body portion for relative pivoting movement. The apparatus can further comprise a first torque assembly having a first motor and a first drive. The first torque assembly can be engaged with the first shaft and can be operable to generate a variable amount of torque against rotation of the first shaft. The apparatus can further comprise a second torque assembly having a second motor and a second drive. The second torque assembly can be engaged with the second shaft and can be operable to generate a variable amount of torque against rotation of the second shaft. The apparatus can further comprise a third torque assembly having a third motor and a third drive. The third torque assembly can be engaged with the third shaft and can be operable to generate a variable amount of torque against rotation of the third shaft. The apparatus can further comprise a head orientation sensor disposed to sense an angular position of the third shaft. The apparatus can further comprise a controller operable to control the first motor and the second motor and the third motor. The at least one linkage sensor can further comprise a first linkage sensor disposed to sense an angular position of the first shaft and a second linkage sensor disposed to sense an angular position of the second shaft. The controller can receive respective signals from the head orientation sensor and from the first linkage sensor and from the second linkage sensor and can controls the respective operations of the first motor and the second motor and the third motor at least partially in response to the respective signals.

According to additional features, the apparatus can further comprise at least one body sensor that can be disposed to sense conditions associated with a position of the apparatus and a rotational orientation of the apparatus relative to a fixed coordinate frame of three-dimensional space.

A combination can comprise the apparatus and the tool. The tool can further comprise a spherical end configured to be received in the one of the male and female connecting portion. The tool can further comprise at least one tool sensor configured to sense at least one of a position of the tool and an orientation of the tool. The tool can further comprise a transceiver disposed to receive signals from the at least one tool sensor and wirelessly transmit the at least one of the position of the tool and the orientation of the tool.

A console can comprise an apparatus, a tool, at least one body sensor, and a processor. The apparatus can have a mount configured to releasably attach to an anchor structure. The apparatus can also have a base movably engaged with the mount whereby a first orientation of the base relative to the mount is adjustable. The apparatus can also have at least one base sensor that can be disposed to sense the first orientation of the base relative to the mount. The apparatus can also have a linkage movably engaged with the base whereby a second orientation of the linkage relative to the base is adjustable. The apparatus can also have at least one linkage sensor disposed to sense the second orientation of the linkage relative to the base. The apparatus can also have a receiver assembly having a body movably engaged with the linkage whereby a third orientation of the body relative to the linkage is adjustable. The receiver assembly can further have one of a male and female connecting portion for releasably receiving the tool. The tool can have a spherical end configured to be received in the one of the male and female connecting portion. The tool can also have at least one tool sensor configured to sense at least one of a position of the tool and an orientation of the tool. The tool can also have a transceiver disposed to receive signals from the at least one tool sensor and wirelessly transmit the at least one of the position of the tool and the orientation of the tool. The at least one body sensor can be disposed to sense conditions associated with at least one of a position of the apparatus within a three-dimensional space and an orientation of the apparatus relative to rotation in the three-dimensional space. The processor can be configured to receive signals from the at least one body sensor corresponding to the sensed conditions. The processor can also be configured to determine, in response to the signals, at least one of the position of the apparatus within the three-dimensional space and the orientation of the apparatus relative to rotation in the three-dimensional space. The processor can also be configured to communicate to the apparatus the at least one of the position of the apparatus within the three-dimensional space and the orientation of the apparatus relative to rotation in the three-dimensional space. The console can further comprise a signal broadcaster that can emit a signal that is sensed by the at least one body sensor.

A haptic apparatus can include a mount, a base, a linkage, at least one sensor, and a receiver assembly. The mount can be configured to releasably attach to an anchor structure. The base can be movably engaged with the mount. The linkage can be movably engaged with the base whereby a first orientation of the linkage relative to the base is adjustable. The at least one sensor can be disposed to sense the first orientation of the linkage relative to the base. The receiver assembly can include a body, a male or female connecting portion, a first arm, and a second arm. The male or female connecting portion can releasably receive a tool. The first arm can be fixed to the body. The second arm can be connected to the body for pivoting movement about an axis between an operating position and a retracted position.

A mechanism for locking and unlocking a tool can comprise a body, a male or female connecting portion, a first arm, and a second arm. The male or female connecting portion can releasably receive a tool. The first arm can be fixed to the body. The second arm can be connected to the body for pivoting movement about an axis between an operating position and a retracted position.

BRIEF DESCRIPTION OF THE DRAWINGS

The detailed description set forth below references the following drawings:

FIG. 24A is an isometric view of the apparatus shown in FIGS. 1-22 supported by a different anchor structure than shown in previous Figures;

FIG. 24B is an isometric view of the apparatus shown in FIGS. 1-22 supported by a different anchor structure than shown in previous Figures;

FIG. 24C is an isometric view of the apparatus shown in FIGS. 1-22 supported by a different anchor structure than shown in previous Figures;

FIG. 25 is a first perspective or isometric view of an apparatus according to a second exemplary embodiment of the present disclosure;

FIG. 26 is a second isometric view of the apparatus shown in FIG. 25;

FIG. 27 is an orthogonal front view of the apparatus shown in FIGS. 25 and 26;

FIG. 28 is an orthogonal right-side view of the apparatus shown in FIGS. 25-27;

FIG. 29 is an orthogonal rear view of the apparatus shown in FIGS. 25-28;

FIG. 30 is an orthogonal left-side view of the apparatus shown in FIGS. 25-29;

FIG. 31 is an orthogonal top view of the apparatus shown in FIGS. 25-30;

FIG. 32 is a first perspective or isometric view of an apparatus according to a third exemplary embodiment of the present disclosure;

FIG. 33 is a second isometric view of the apparatus shown in FIG. 32;

FIG. 34 is an orthogonal front view of the apparatus shown in FIGS. 32 and 33;

FIG. 35 is an orthogonal right-side view of the apparatus shown in FIGS. 32-34;

FIG. 36 is an orthogonal rear view of the apparatus shown in FIGS. 32-35;

FIG. 37 is an orthogonal left-side view of the apparatus shown in FIGS. 32-36;

FIG. 38 is an orthogonal top view of the apparatus shown in FIGS. 32-37;

FIG. 39 is a schematic representation of an exemplary console;

FIGS. 40A-40C are schematic representations of console schemes in which the apparatus shown in FIGS. 32-37 can be utilized; and FIGS. 41A-41C show a progression of a removal of a tool from the receiver assembly.

DETAILED DESCRIPTION

Figure 1:
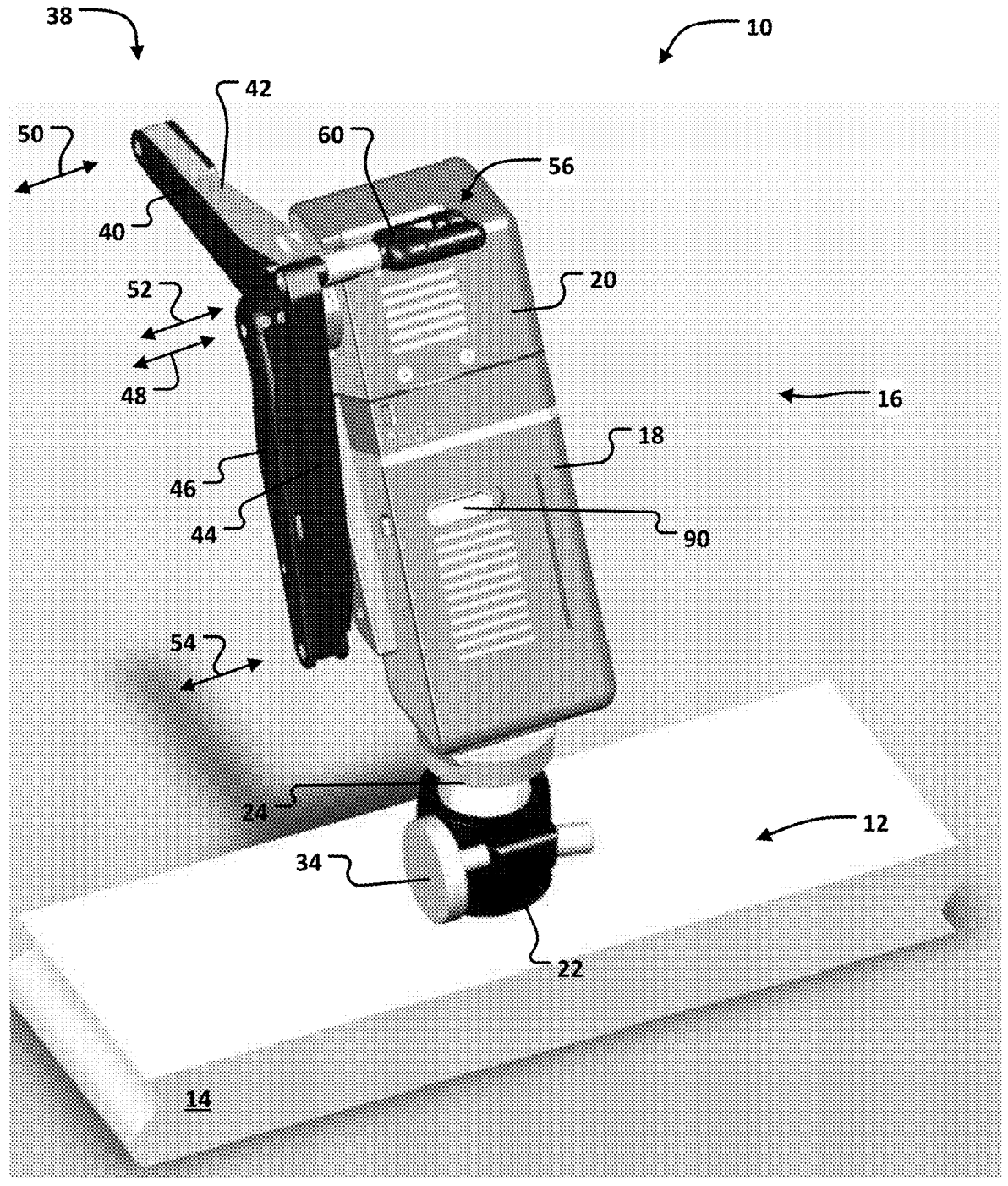
FIG. 1 is a first perspective or isometric view of an apparatus according to a first exemplary embodiment of the present disclosure.
Figure 2:
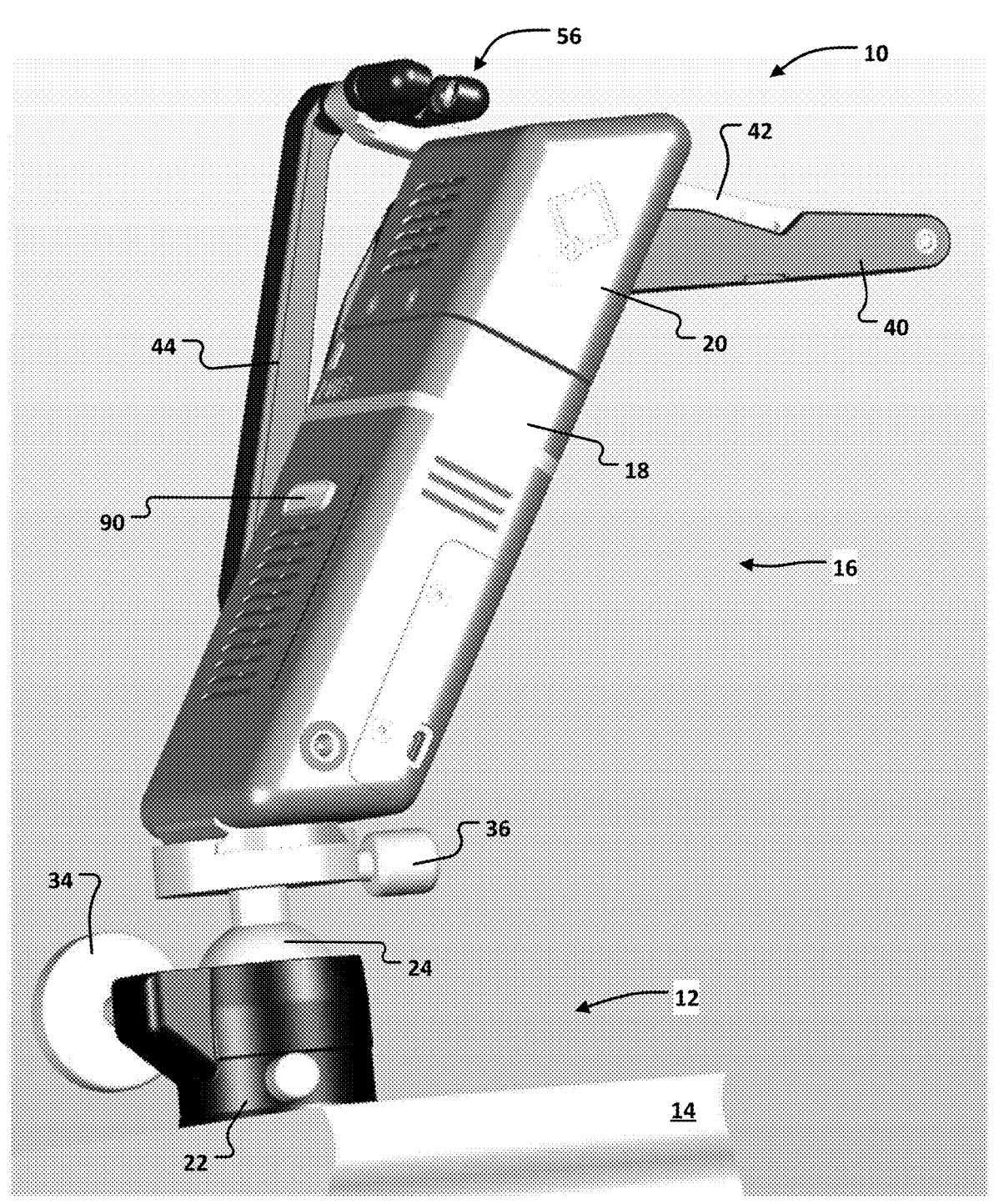
FIG. 2 is a second isometric view of the apparatus shown in FIG. 1.
Figure 3:
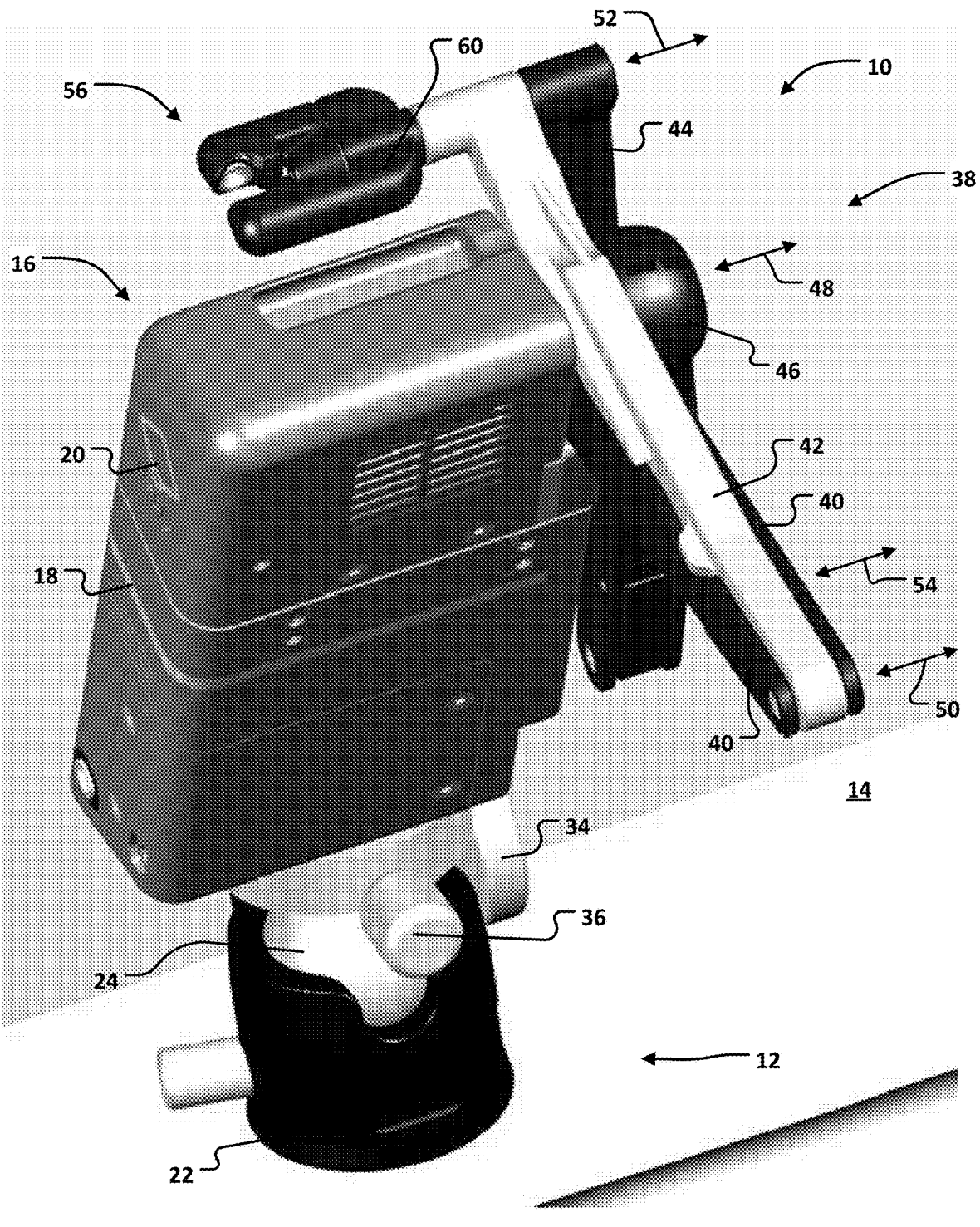
FIG. 3 is a third isometric view of the apparatus shown in FIGS. 1 and 2.
Figure 4:
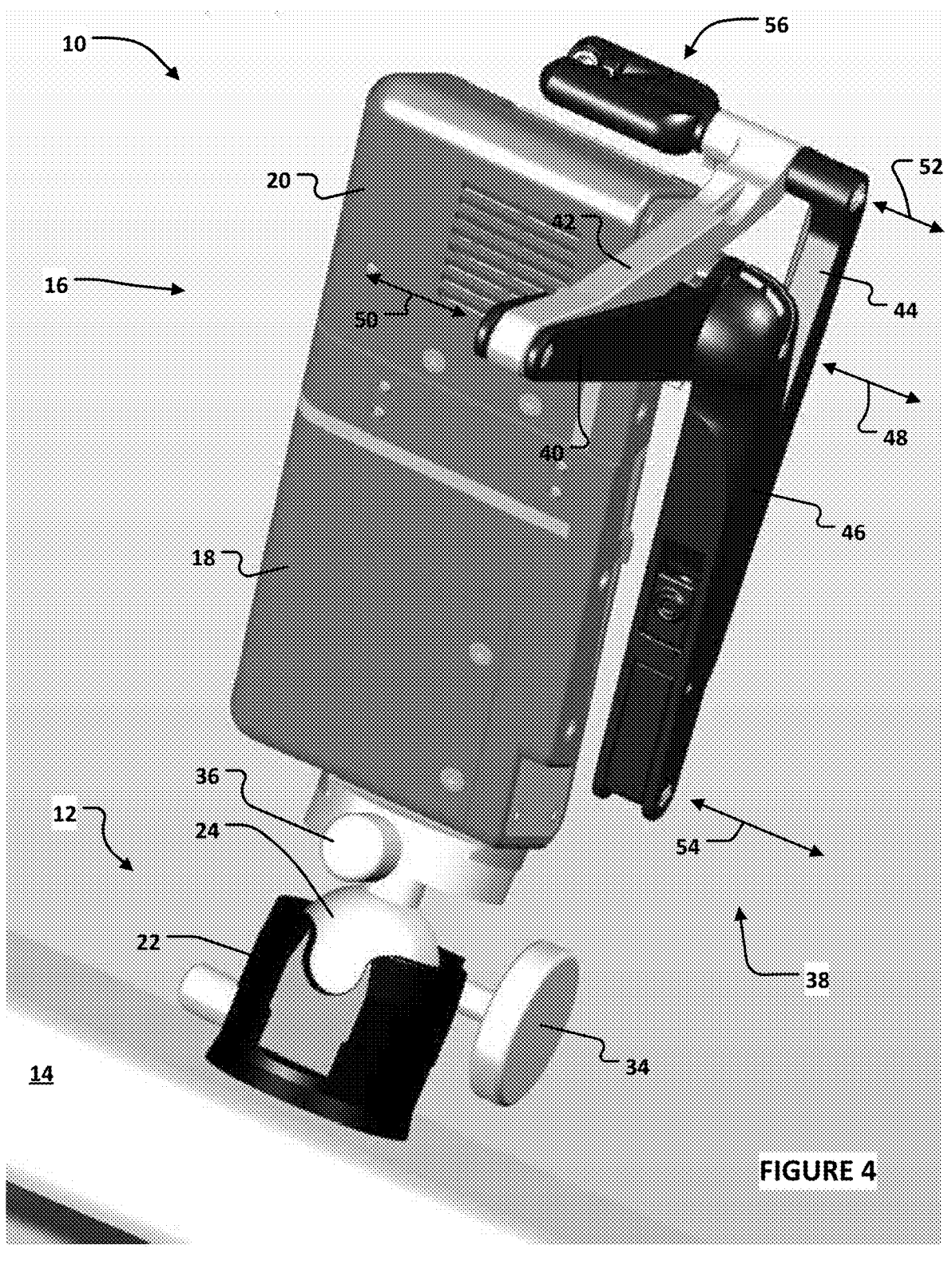
FIG. 4 is a fourth isometric view of the apparatus shown in FIGS. 1-3.
Figure 5:
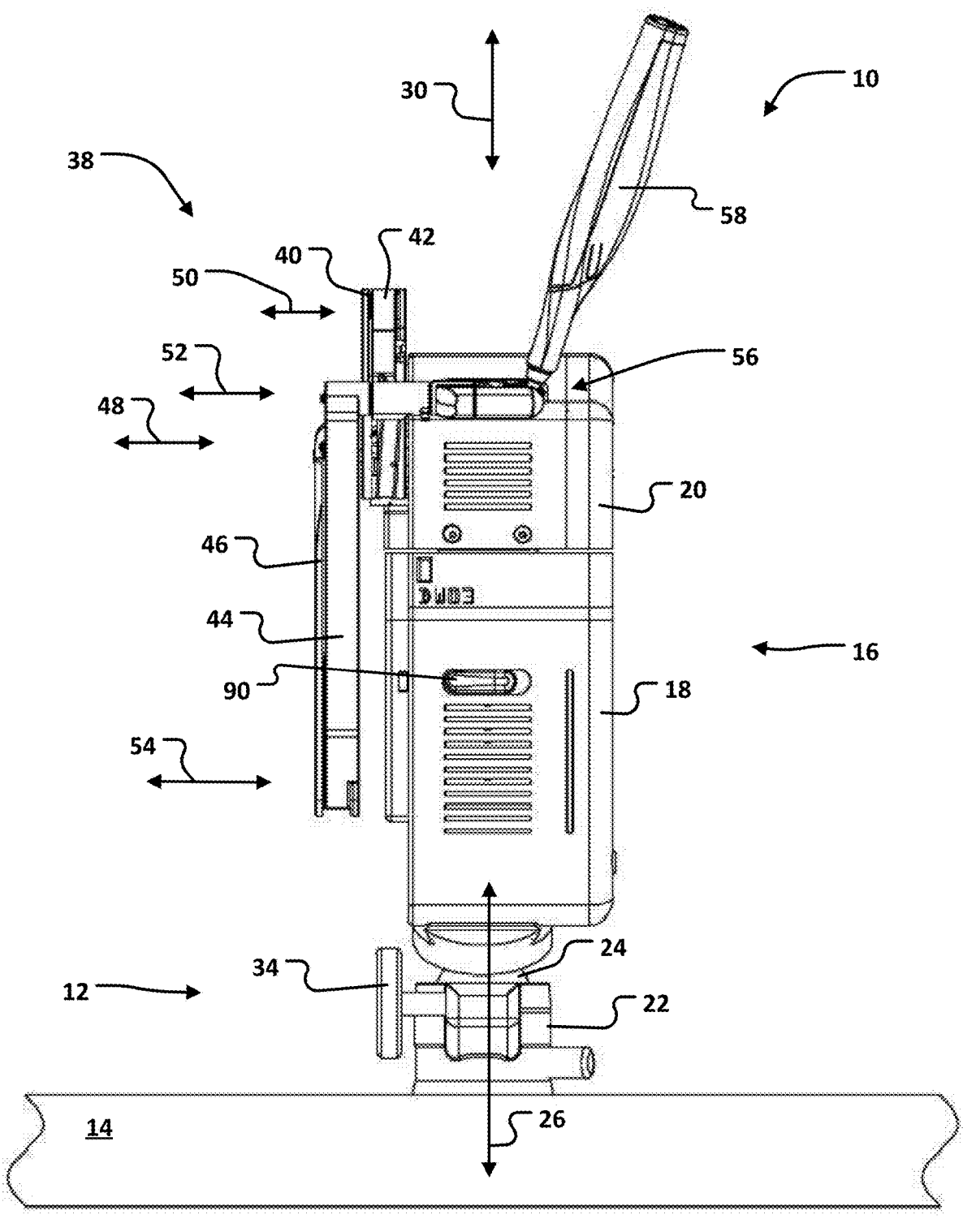
FIG. 5 is an orthogonal front view of the apparatus shown in FIGS. 1-4.
Figure 6:
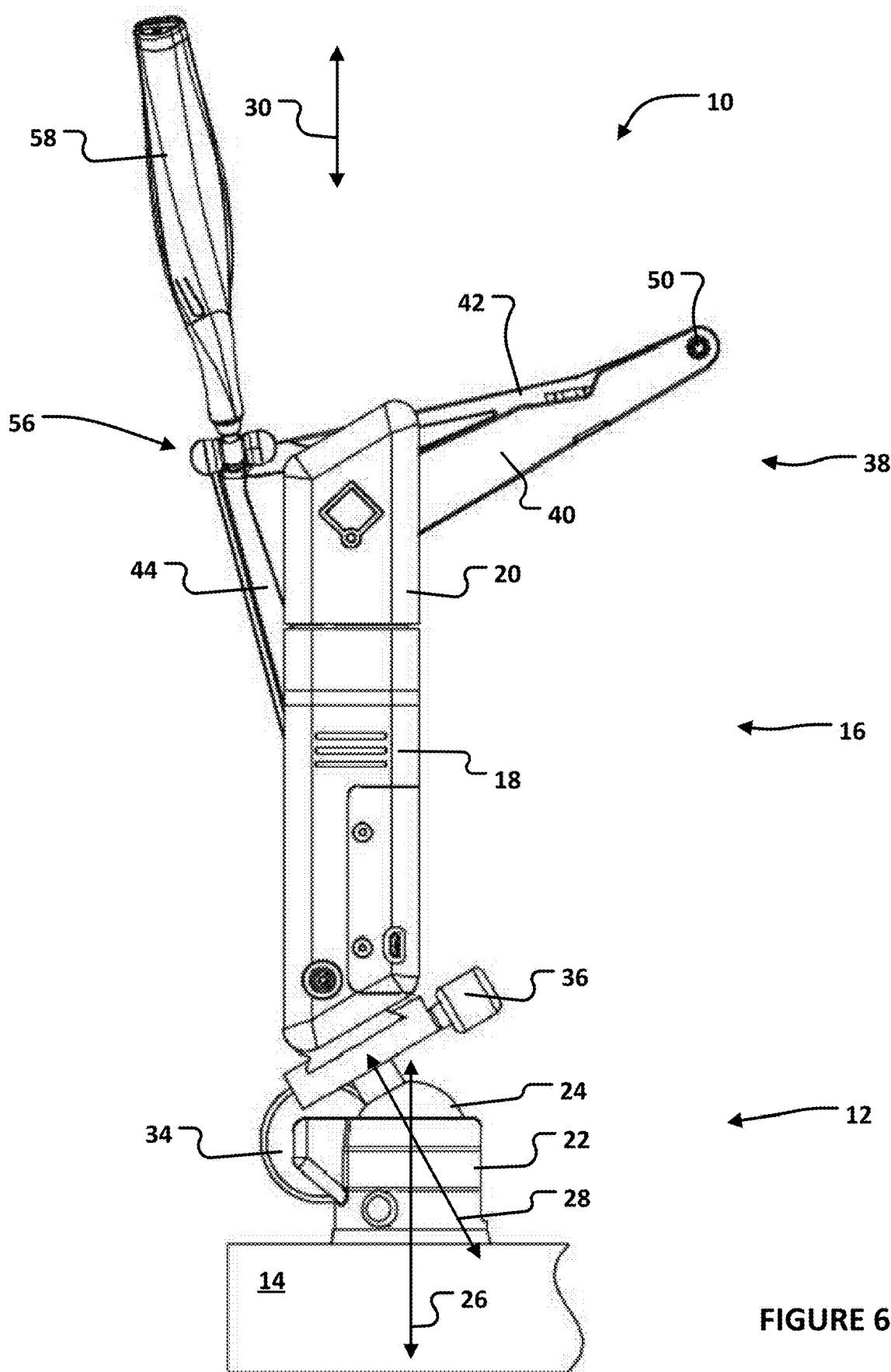
FIG. 6 is an orthogonal right-side view of the apparatus shown in FIGS. 1-5.
Figure 7:
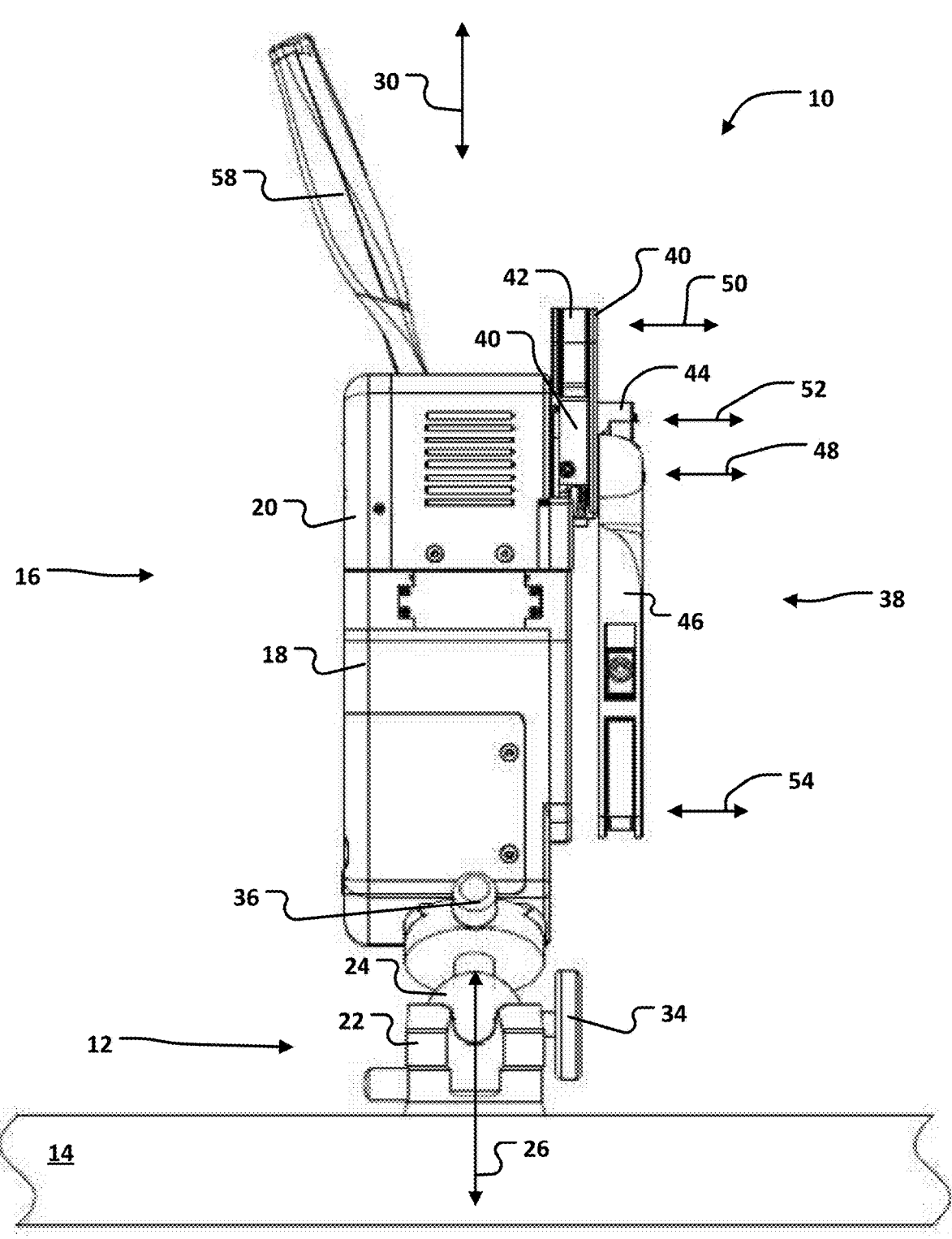
FIG. 7 is an orthogonal rear view of the apparatus shown in FIGS. 1-6.
Figure 8:
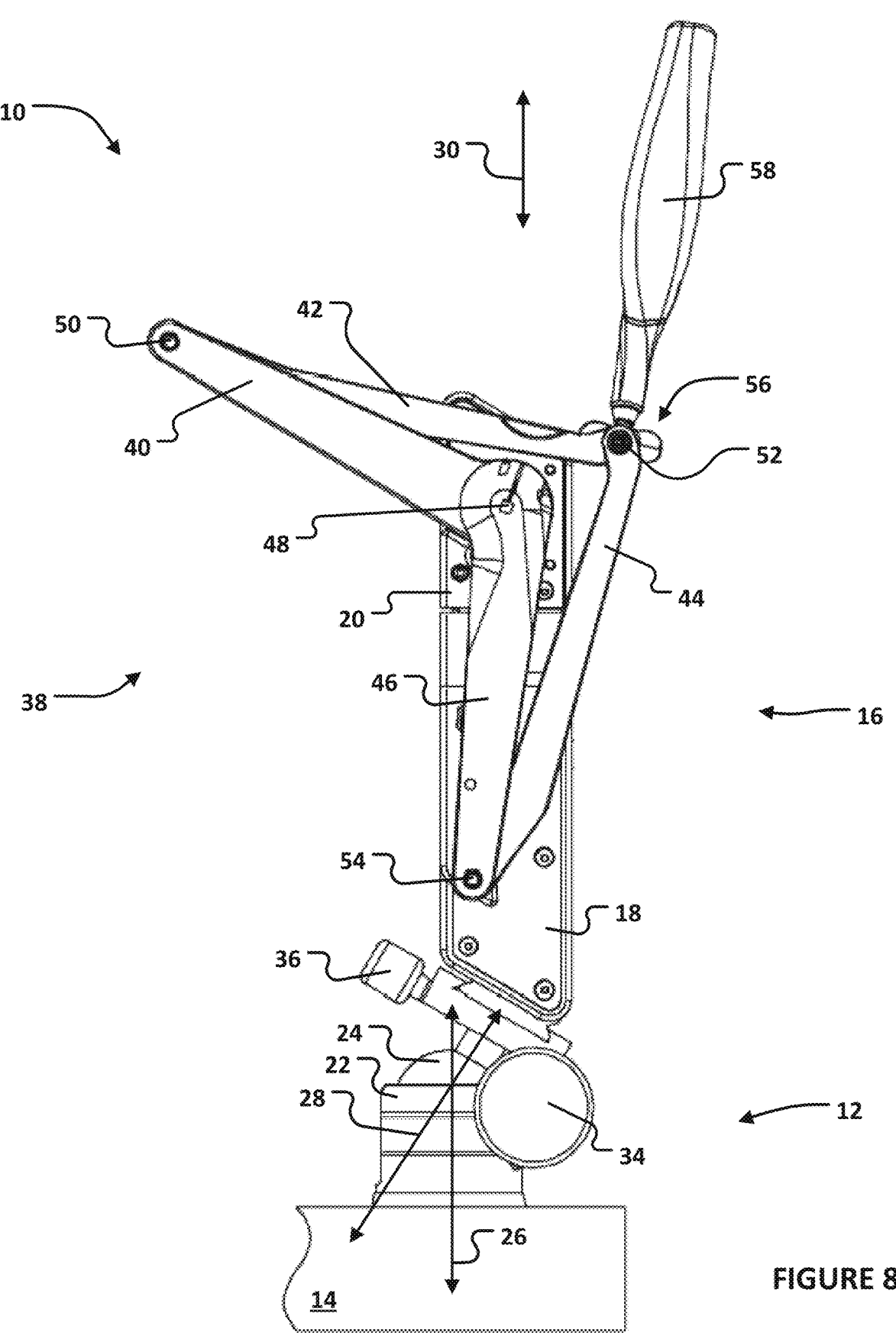
FIG. 8 is an orthogonal left-side view of the apparatus shown in FIGS. 1-7.
Figure 9:
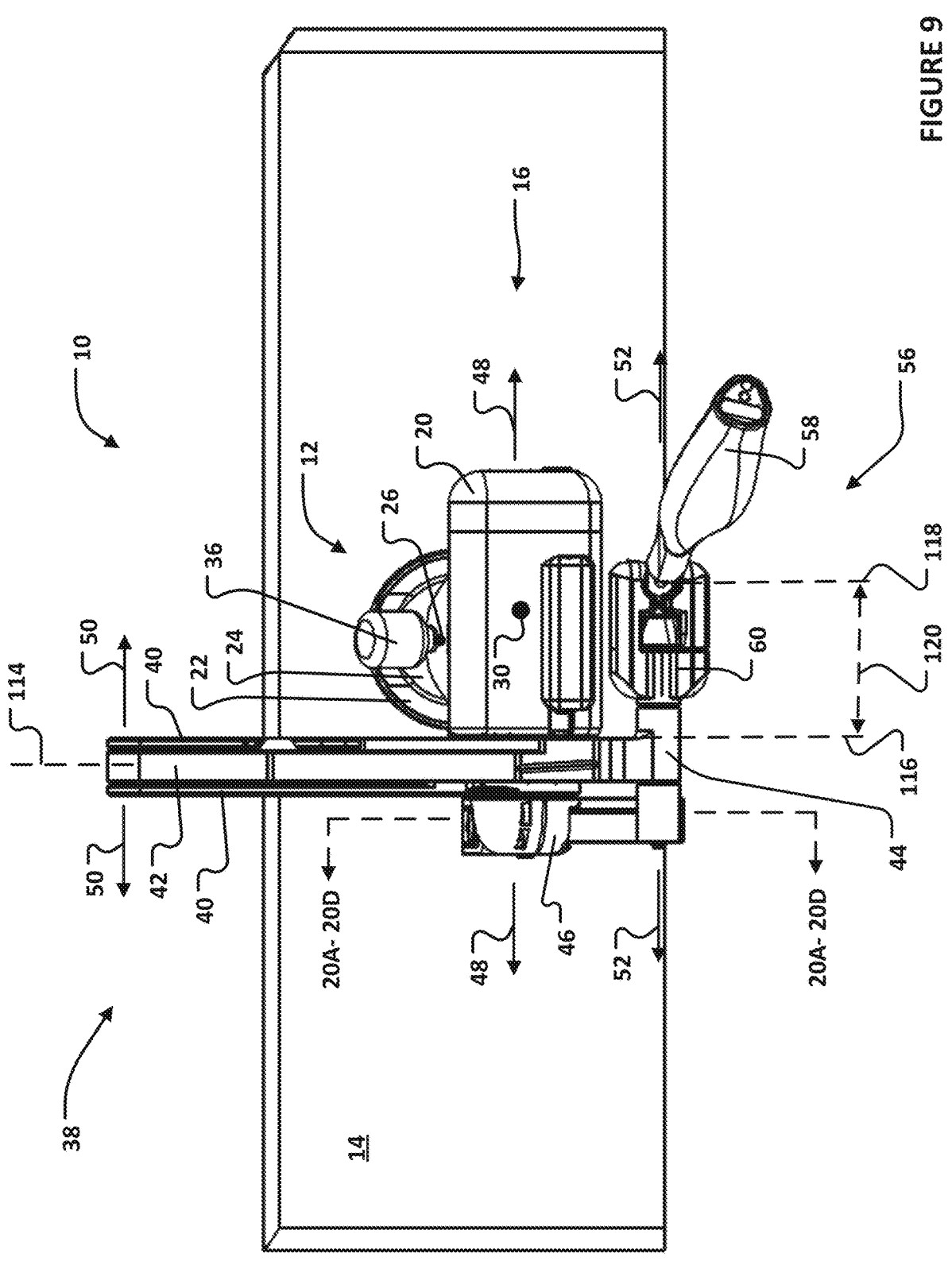
FIG. 9 is an orthogonal top view of the apparatus shown in FIGS. 1-8.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Also, to enhance consistency, the structures in any particular drawing may share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below and shown in the Figures, provides an enhanced apparatus for tracking motion and providing haptic feedback. An apparatus according to the present disclosure can be utilized in augmented and virtual reality systems. An apparatus according to the present disclosure can also be utilized operating environments in which motion at a first location is replicated at a second location that is physically remote from the first location, such as remote surgery or "tele-surgery." An apparatus according to the present disclosure can also be utilized operating environments in which motion at a first location is tracked and applied at a second location that is physically remote from the first location, such as master-slave robot control. Tele-surgery would be a subset of master-slave robot control and another would be "teleoperation." An apparatus according to the present disclosure can also provide haptic feedback in addition to tracking motion. The present disclosure also provides enhanced methods performable with and/or by the apparatus. The teachings of the present disclosure can be applied in augmented and virtual reality systems utilized for any purpose, including training, game play, component design, and commerce. Aspects of the apparatus have been found to be particularly useful relative to compactness and transportability relative devices in the prior art.

Referring now to FIGS. 1-13, according to a first exemplary embodiment of the present disclosure, an exemplary apparatus 10 for, by way of example and not limitation, augmented and virtual reality systems includes an exemplary mount 12 configured to releasably attach to an anchor structure 14. The exemplary mount 12 can include a clamp, one or more suction cups, or adhesive for releasably attaching to the exemplary anchor structure 14. Adhesive can take the form of microsuction tape or gecko tape. The exemplary anchor structure 14 shown in the FIGS. 1-13 is a table, but other structures could be utilized in other operating environments. It is noted that an anchor structure provides a substantially fixed surface so that mount 12 does not move while the apparatus 10 is being used.

The exemplary apparatus 10 also includes an exemplary base 16 that is movably engaged with the exemplary mount 12. The exemplary base 16 includes a first portion 18 that can be referred to as a "body" of the base 16 and a second portion 20 that can be referred to as a "head" of the base 16. The exemplary first portion 18 and exemplary second portion 20 are rotatable relative to one another.

The exemplary mount 12 includes a first socket 22 and the exemplary base 16 includes a first ball 24. The first ball 24 is received in the first socket 22. A first axis 26 extends through the exemplary mount 12 and is centered on the first socket 22, the portion of the exemplary mount 12 that directly engages the exemplary base 16. A second axis 28 extends through the exemplary base 16 and is centered on the first ball 24, the portion of the exemplary base 16 that directly engages the exemplary mount 12. The exemplary axes 26 and 28 intersect at the center of the exemplary ball 24. The exemplary first portion 18 and exemplary second portion 20 can be rotatable relative to one another about the second axis 28 or about another axis. In the exemplary embodiment, the exemplary first portion 18 and exemplary second portion 20 can be rotatable relative to one another about an axis 30. It is noted in other embodiments of the present disclosure, the mount 12 could include a ball and the base 16 could include a socket.

The exemplary base 16 is thus moveable relative to the exemplary mount 12 whereby a first orientation of the exemplary base 16 relative to the exemplary mount 12 is adjustable. The exemplary base 16 is rotatable relative to the exemplary mount 12 about the first axis 26. The exemplary base 16 is also pivotable relative to the exemplary mount 12 such that a first angle that is defined between the first axis 26 and the second axis 28 is variable. The first angle is referenced at 32 in FIG. 13.

One of the mount 12 and the base 16 can include one more locks to fix the orientation of body 18 and the mount 12. The exemplary apparatus 10 includes a first lock 34 to selectively prevent pivoting of the exemplary base 16 relative to the exemplary mount 12 and fixing the first angle 32. The apparatus 10 can also include a second lock 36 to selectively prevent rotation of the exemplary base 16 relative to the exemplary mount 12 about the axis 26. The use of a ball joint (24, 26) between the ground and the base 16 allows for quick reconfiguring of the apparatus 10 to account for a variety of procedures, allowing quick repositioning of the base 16 of the apparatus.

In one or more operating environments for embodiments of the present disclosure, the apparatus 10 could be mounted to an anchor structure other than a table. Referring now to FIG. 24A, a tripod can define the anchor structure for the apparatus 10. Referring now to FIG. 24B, a wall can define the anchor structure for the apparatus 10. In still other operating environments, the apparatus 10 could be mounted on a mobile platform, such as body mounted on chest plate or a belt such as shown in FIG. 24C or a full body apparatus.

Referring again to FIGS. 1-13, the exemplary apparatus 10 also includes a linkage 38 movably engaged with the exemplary base 16 whereby a second orientation of the linkage 38 relative to the exemplary base 16 is adjustable. The exemplary second portion 20 or head of the exemplary base 16 directly engages the linkage 38. The exemplary linkage 38 is rotatably mounted on the exemplary base 16. At least part of the exemplary linkage 38 rotates in a first plane (referenced at 114 in FIG. 9) and the axis 30 extends parallel to the first plane 114.

The exemplary linkage 38 includes a plurality of links including an exemplary first link 40, an exemplary second link 42, an exemplary third link 44, and an exemplary fourth link 46. The exemplary first link 40 and the exemplary fourth link 46 are directly engaged with the exemplary base 16 for pivoting movement about a third axis 48. The exemplary first link 40 and the exemplary fourth link 46 can rotate about the third axis 48 relative to one another.

The exemplary first link 40 and the exemplary second link 42 are directly engaged with one another for relative pivoting movement about a fourth axis 50. The exemplary second link 42 and the exemplary third link 44 are directly engaged with one another for relative pivoting movement about a fifth axis 52. The exemplary third link 44 and the exemplary fourth link 46 are directly engaged with one another for relative pivoting movement about a sixth axis 54. The exemplary first link 40 and the exemplary third link 44 are not directly engaged with one another for relative pivoting movement. The exemplary second link 42 and the exemplary fourth link 46 are not directly engaged with one another for relative pivoting movement. One or more of the plurality of links 40, 42, 44, 46 can be fully or partially optically transparent. An optically transparent structure has the property of being able to transmit light without appreciable scattering so that bodies lying beyond are seen clearly.

The exemplary apparatus 10 also includes an exemplary receiver assembly 56 having a body 60 movably engaged with the exemplary linkage 38 whereby a third orientation of the body 60 relative to the exemplary linkage 38 is adjustable. The exemplary receiver assembly 56 is rotatable relative to the exemplary linkage 38 about the fifth axis 52. The exemplary receiver assembly 56 can interconnect the apparatus 10 with a tool, such as tool 58, that is grasped and moved by a user of the apparatus 10 while the user interacts with, by way of example and not limitation, an augmented or virtual reality environment. As the user moves the tool 58, angularly and rectilinearly, the apparatus 10 can track the position of the tip of the tool 58 that is retained by the exemplary receiver assembly 56. It is noted that in the exemplary embodiment, a spherical end 152 of the tool 58 does not translate relative to the receiver assembly 56.

Referring now to FIGS. 14-18, the exemplary receiver assembly 56 also includes a first arm 62 fixed to the exemplary body 60 of the exemplary receiver assembly 56. The exemplary receiver assembly 56 also includes a second arm 64 connected to the exemplary body 60 for pivoting movement about a seventh axis. In the exemplary apparatus 10, the fifth axis 52 and the seventh axis are collinear.

Figure 14:
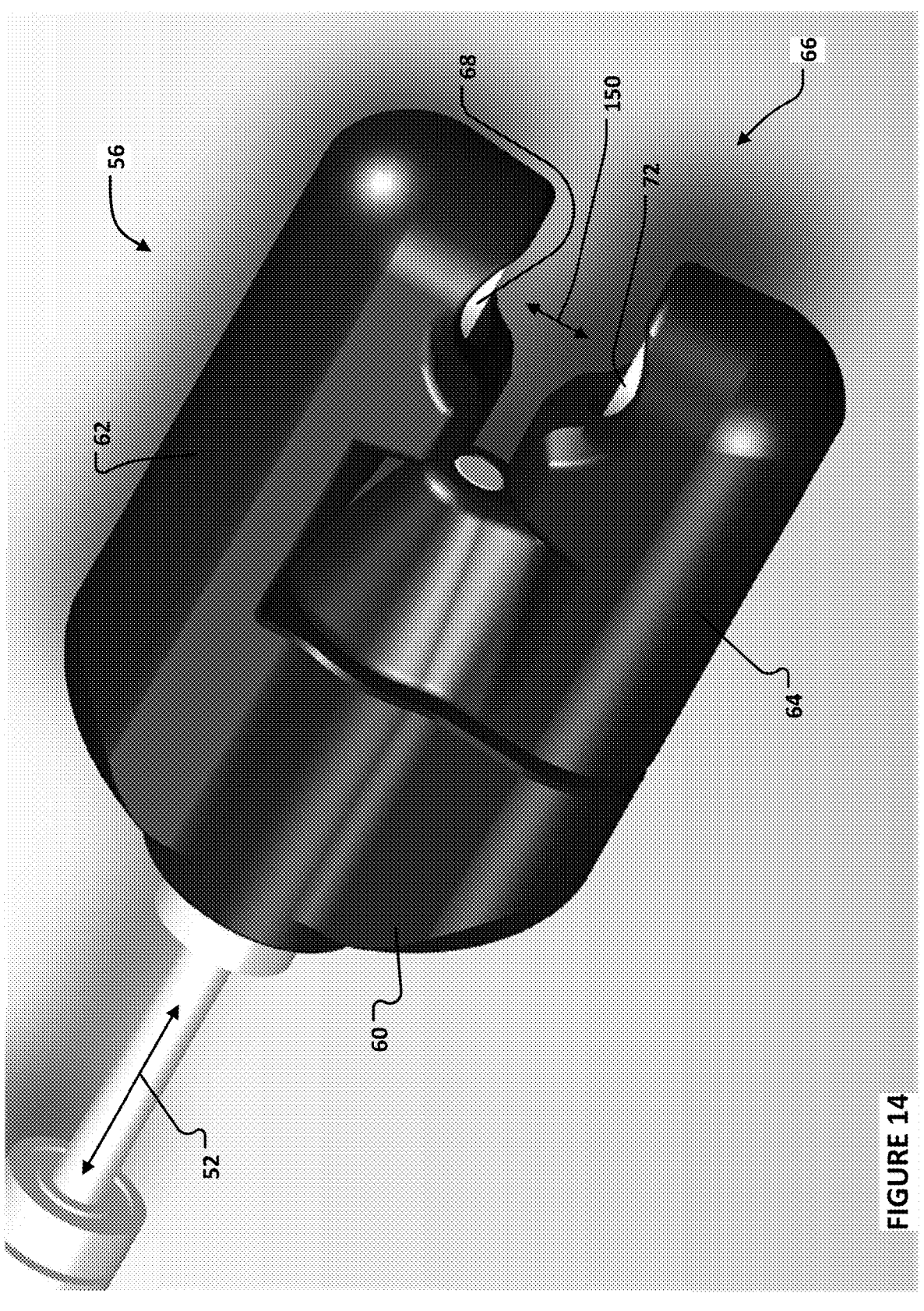
FIG. 14 is a first isometric view of a receiver assembly of the apparatus shown in FIGS. 1-13 wherein a pivot arm of the receiver assembly is in a closed or operating position.
Figure 16:
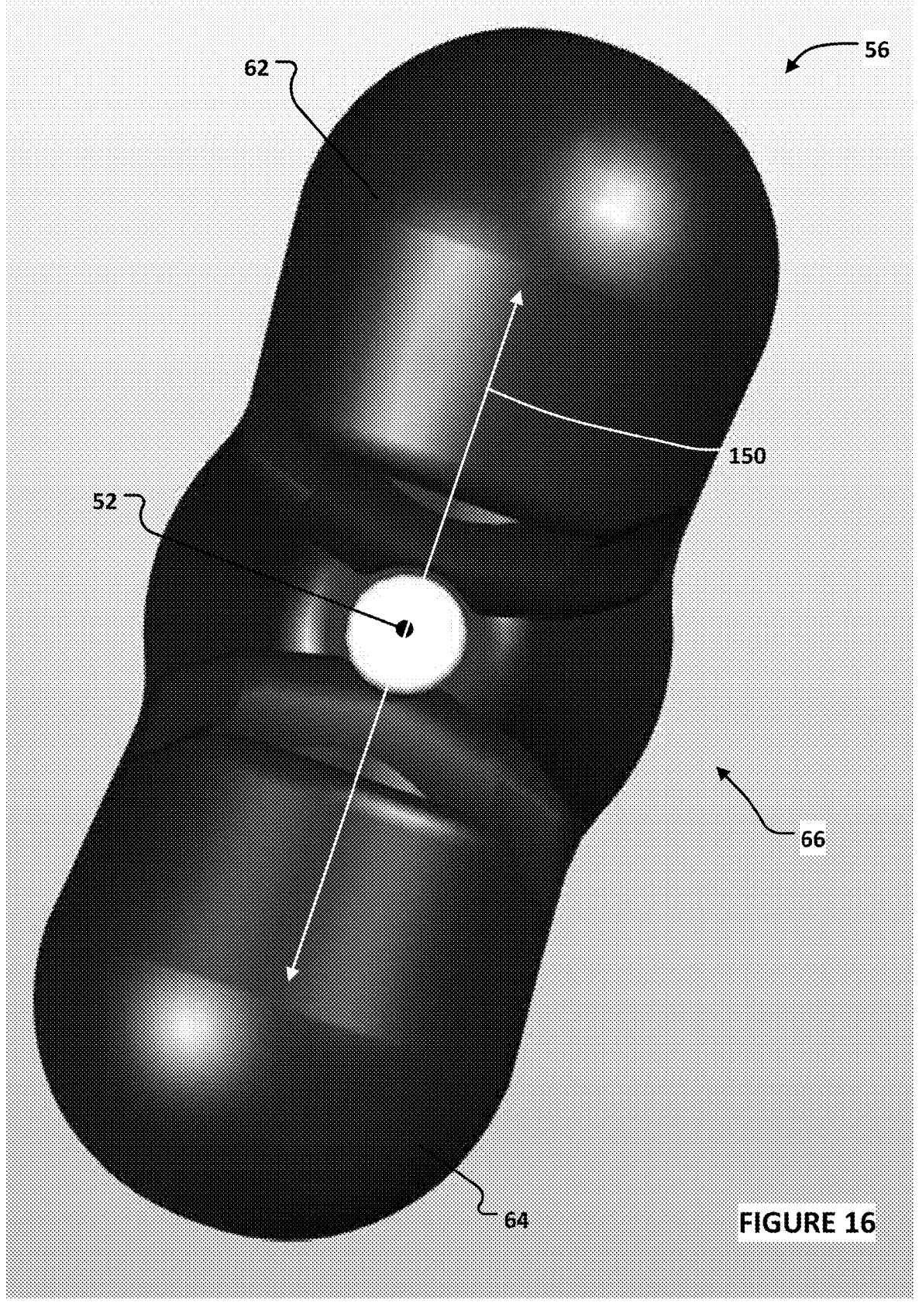
FIG. 16 is an orthogonal view of a distal end of the receiver assembly shown in FIG. 14.
Figure 17:
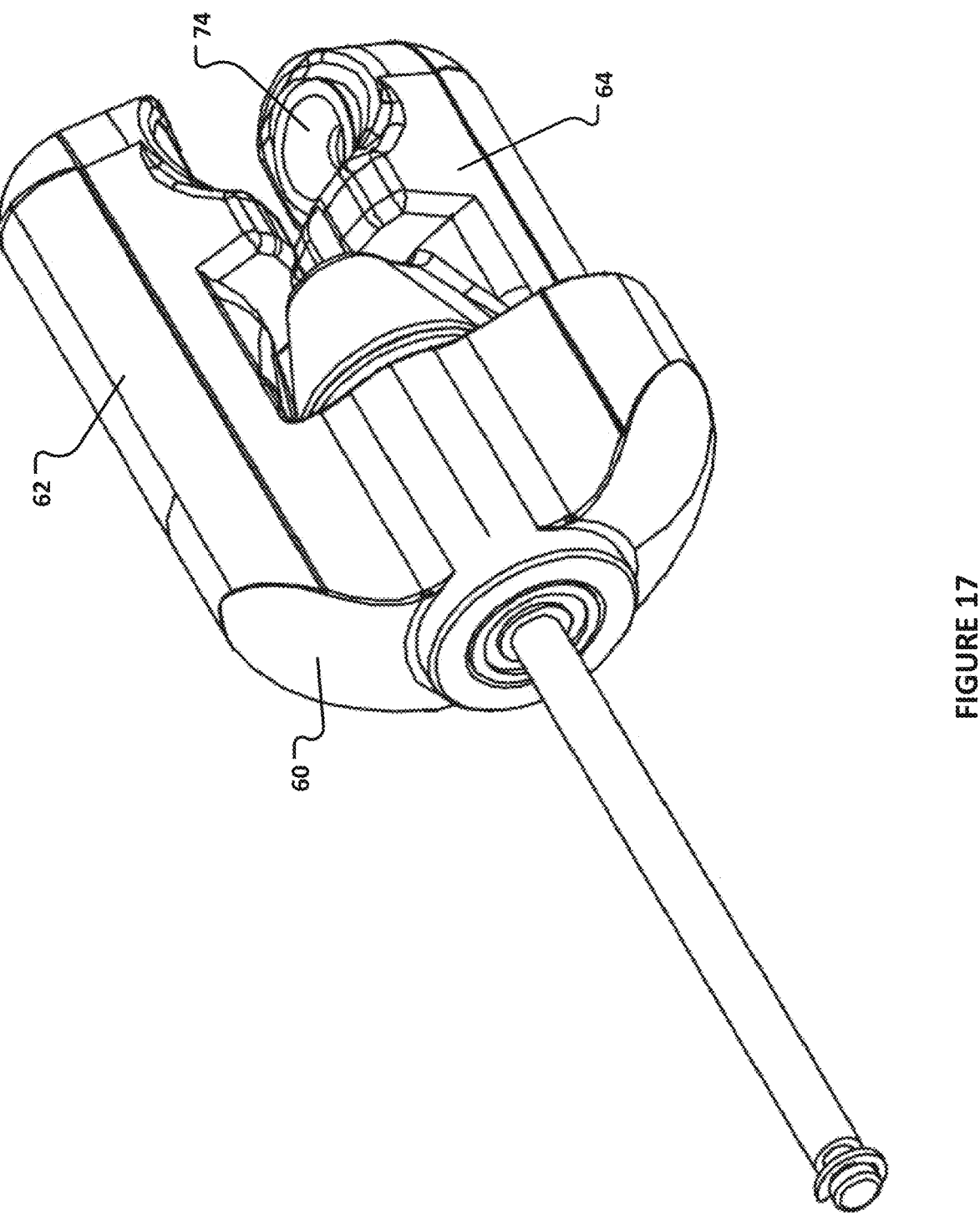
FIG. 17 is an isometric view of the receiver assembly of the apparatus shown in FIGS. 1-14 wherein the pivot arm of the receiver assembly is in an open or retracted position.
Figure 18:
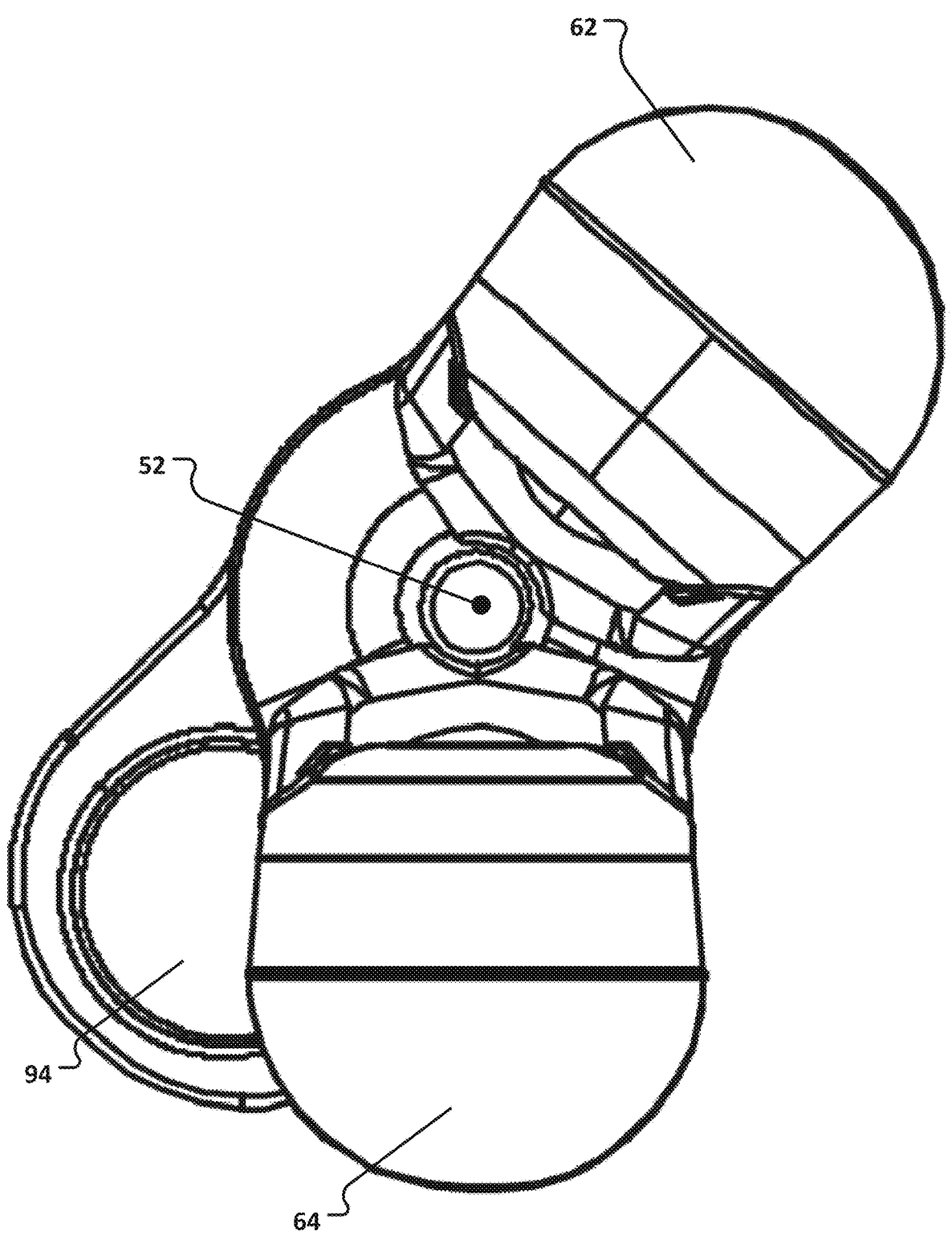
FIG. 18 is an orthogonal view of a distal end of the receiver assembly shown in FIG. 17 with the pivot arm of the receiver assembly is in the retracted position.

The second arm 64 is pivotable between an operating position such as shown in FIGS. 14 and 16 and a retracted position such as shown in FIGS. 17 and 18. The tool 58 is held by the exemplary receiver assembly 56 when the second arm 64 is in the operating position. The tool 58 is released from the exemplary receiver assembly 56 when the second arm 64 is in the retracted position.

The exemplary receiver assembly 56 also includes one of a male and female connecting portion. The exemplary receiver assembly 56 includes a female connecting portion 66, but could include a male connecting portion 66 in other embodiments of the present disclosure. The connecting portion 66 releasably receives the tool 58.

The connecting portion 66 can include at least a portion of a concave surface or a convex surface that is configured to engage a corresponding surface defined by the tool 58, so a ball and socket joint is defined between the connecting portion 66 and the tool 58.

The exemplary connecting portion 66 includes an exemplary first socket half 68 defining a first receiving surface 94 (referenced in FIG. 18). The exemplary socket half 68 can be a magnet as well. The exemplary first receiving surface 94 can be at least partially spherical with a first center of curvature or can be partially conical and centered on a first cone axis 70. The exemplary first receiving surface 94 is partially conical and centered on an exemplary first cone axis 70. The exemplary first socket half 68 positioned on the first arm 62.

Figures 15A, 15B:
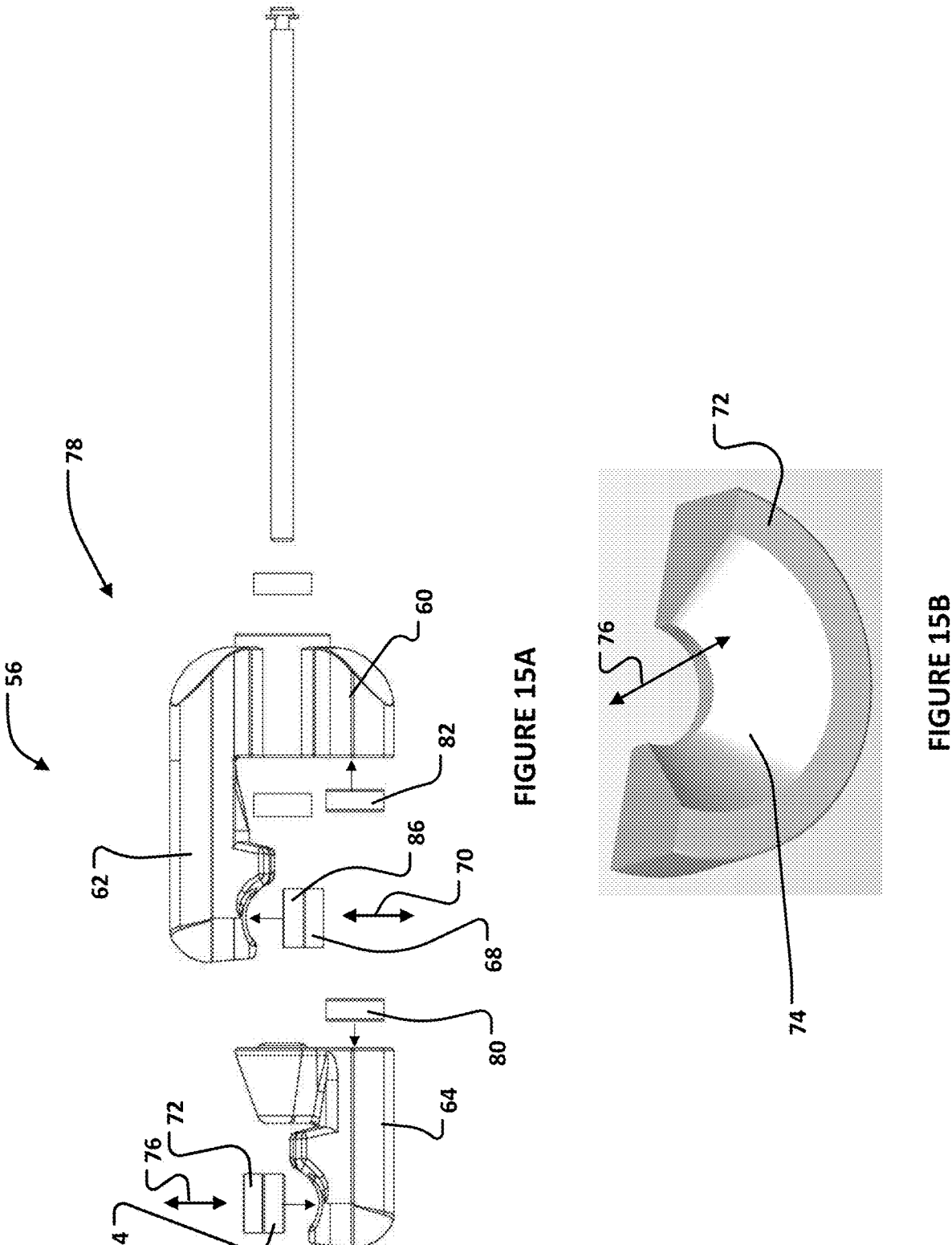
FIG. 15A is an exploded view of the receiver assembly shown in FIG. 14.
FIG. 15B is an isometric and cross-sectional view of part of a connecting portion of the receiver assembly shown in FIG. 14.

The exemplary connecting portion 66 also includes an exemplary second socket half 72 defining an exemplary second receiving surface 74. The exemplary socket half 72 can be a magnet as well. In the exemplary apparatus 10, the exemplary first socket half 68 and the exemplary second socket half 72 are identically-shaped. FIG. 15B is an isometric and cross-sectional view of the exemplary second socket half 72; the exemplary first socket half 68 is shaped the same as the exemplary second socket half 72.

The exemplary second receiving surface 74 of can be at least partially spherical with a second center of curvature or can be partially conical and centered on an exemplary second cone axis 76. The exemplary second receiving surface 74 is partially conical and centered on an exemplary second cone axis 76. The exemplary second socket half 72 positioned on the second arm 64. The spherical end 152 of the exemplary tool 58 is received by and contacts the first receiving surface 94 and the second receiving surface 74.

When the exemplary second arm 64 is in the operating position, if the first receiving surface and the second receiving surface were partially spherical, the first center of curvature and the second center of curvature would substantially coincide. When the exemplary second arm 64 is in the retracted position, the receiving assembly has the largest receptacle capacity. In other words, in the retracted position the area through which a tool can be inserted is large enough to receive the tool. In the operating position, in contrast, a tool cannot be directed into the receiving assembly.

When the exemplary second arm 64 is in the operating position, with the first receiving surface 94 and the exemplary second receiving surface 74 being partially conical, the exemplary first cone axis 70 and the exemplary second cone axis 76 are collinear. When the exemplary second arm 64 is in the retracted position, the exemplary first cone axis 70 and the exemplary second cone axis 76 are at a maximum angle relative to one another.

FIG. 41A shows the tool 58 engaged with connecting portion 66 and the second arm 64 in the operating position. The spherical end 152 of the tool 58 is captured between exemplary first receiving surface 94 (referenced in FIG. 18) and the exemplary second receiving surface 74 (referenced in FIG. 15B). FIG. 41B shows the second arm 64 pivoted to the retracted position, whereby the tool 58 can be removed. The exemplary second receiving surface 74 has been moved away from the exemplary first receiving surface 94. FIG. 41C shows the tool 58 withdrawn from the exemplary connecting portion 66.

Referring now to FIGS. 14 and 16, an axis 150 can extend through a center of the connecting portion 66, normal to and intersecting the axis 52. The axes 70, 76 are collinear with the axis 150 when the arm 64 is in the operating position. The axis 150 causes physical constraints that allow the user to perform rapid instrumentation switches to swap the current tool 58 for a different one by means of rotating the tool 58 about the axis 150 toward the axis 52, such that the tool 50 collides with a rotating gimbal stage (the cone 72 and arm 64) that causes it to disengage from its parallel configuration with the opposing fixed gimbal stage (the cone 68 and arm 62), thus misaligning the physical housing of the spherical joint and allowing for the elimination of translation constraints on the spherical joint. Quick tool changing functionality allows the apparatus 10 to transition between states, such as a position control mode, to facilitate tool swapping by maintaining the position of the linkage 38 while the arm 64 is in a retracted position.

The exemplary connecting portion 66 is offset from the linkage 38 to reduce the likelihood that a user's hand will contact the linkage 38 during use of the apparatus 10. A plane (referenced at 116 in FIG. 9) contains at least two of the plurality of links 40-46. The exemplary links 40, 42 extend in the exemplary plane 116. The plane 116 is normal to the axis 48 and is the closest such plane (containing at least two links and normal to axis 48) to the connecting portion 66. The plane 116 is at least thirty millimeters from a center of the connecting portion 66. The center of the connecting portion 66 is referenced in FIG. 9 by a plane 118 and the distance between the planes 116, 118 is referenced at 120.

Referring now to FIG. 15A, the exemplary receiver assembly 56 also includes a biasing device that biases the second arm 64 to the operating position. The exemplary receiver assembly 56 can include any kind of biasing device, such as a spring. The exemplary biasing device 78 includes first and second pairs of magnets. Exemplary magnets 80, 82 define a first pair of magnets and exemplary magnets 84, 86 define a second pair of magnets.

A first magnet 80 of the first pair of magnets and a first magnet 84 of the second pair of magnets are mounted on the exemplary second arm 64 in spaced relation to one another. A second magnet 82 of the first pair of magnets is mounted on the exemplary body 60. A second magnet 86 of the second pair of magnets is mounted on the exemplary first arm 62.

The first magnet 80 of the first pair of magnets and the second magnet 82 of the first pair of magnets are arranged to attract one another and align with one another when the second arm 64 is in the operating position. The magnetic field generated between the magnets 80, 82 biases the second arm 64 to remain in the operating position. The first magnet 84 of the second pair of magnets and the second magnet 86 of the second pair of magnets are arranged to attract one another and align with one another when the second arm 64 is in the operating position. The magnetic field generated between the magnets 84, 86 biases the second arm 64 to remain in the operating position. When the second arm 64 is the retracted position, the magnetic attraction between the magnets 80, 82 and the magnetic attraction between the magnets 84, 86 tends to bias the second arm 64 to the operation position.

Figure 10:
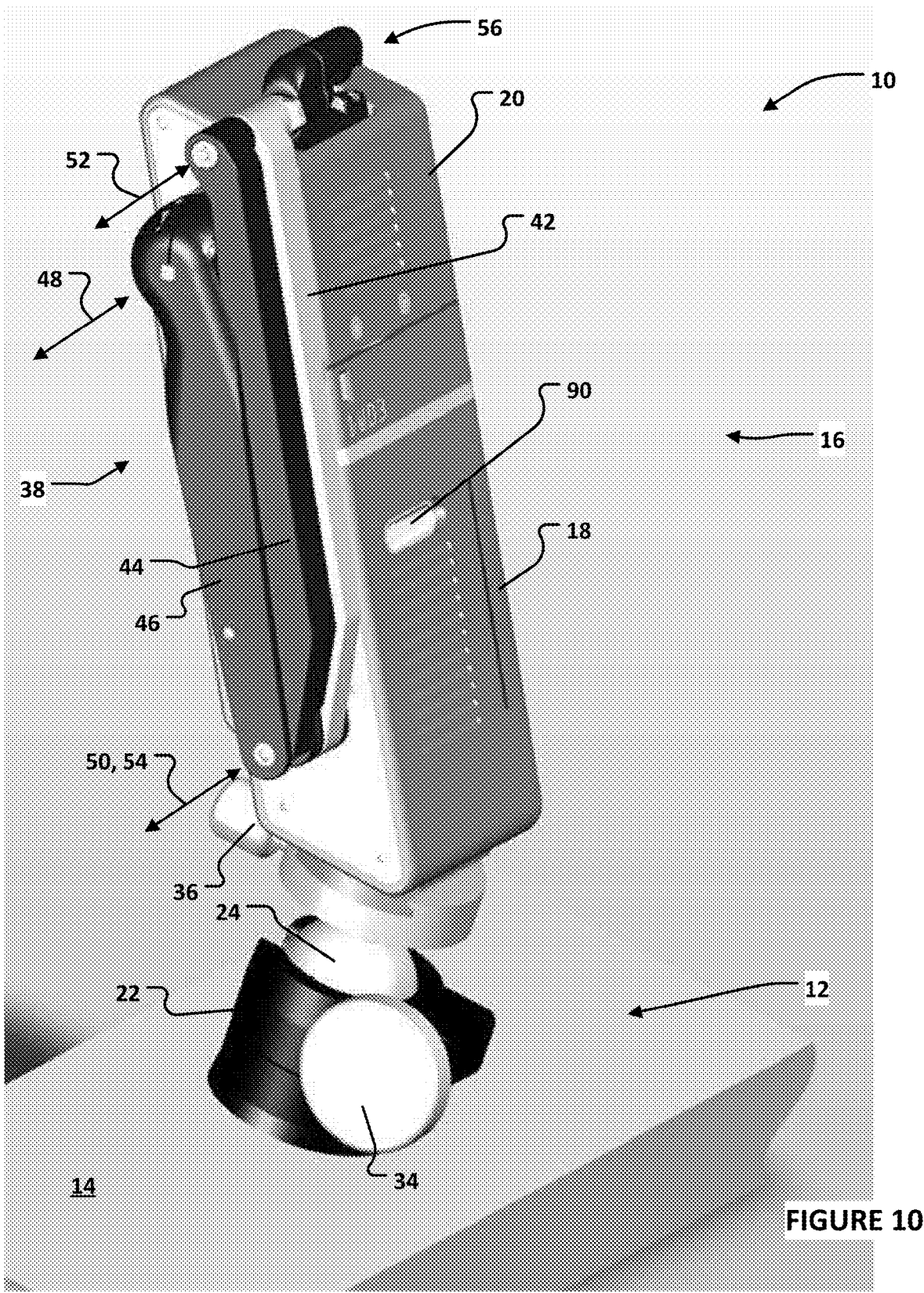
FIG. 10 is a fifth isometric view of the apparatus shown in FIGS. 1-9 wherein an orientation of a base of the apparatus relative to a mount of the apparatus has been changed relative to the orientation shown in FIGS. 1-9 and an orientation of links of a linkage of the apparatus relative to the base of the apparatus has been changed relative to the orientation shown in FIGS. 1-9.
Figure 19:
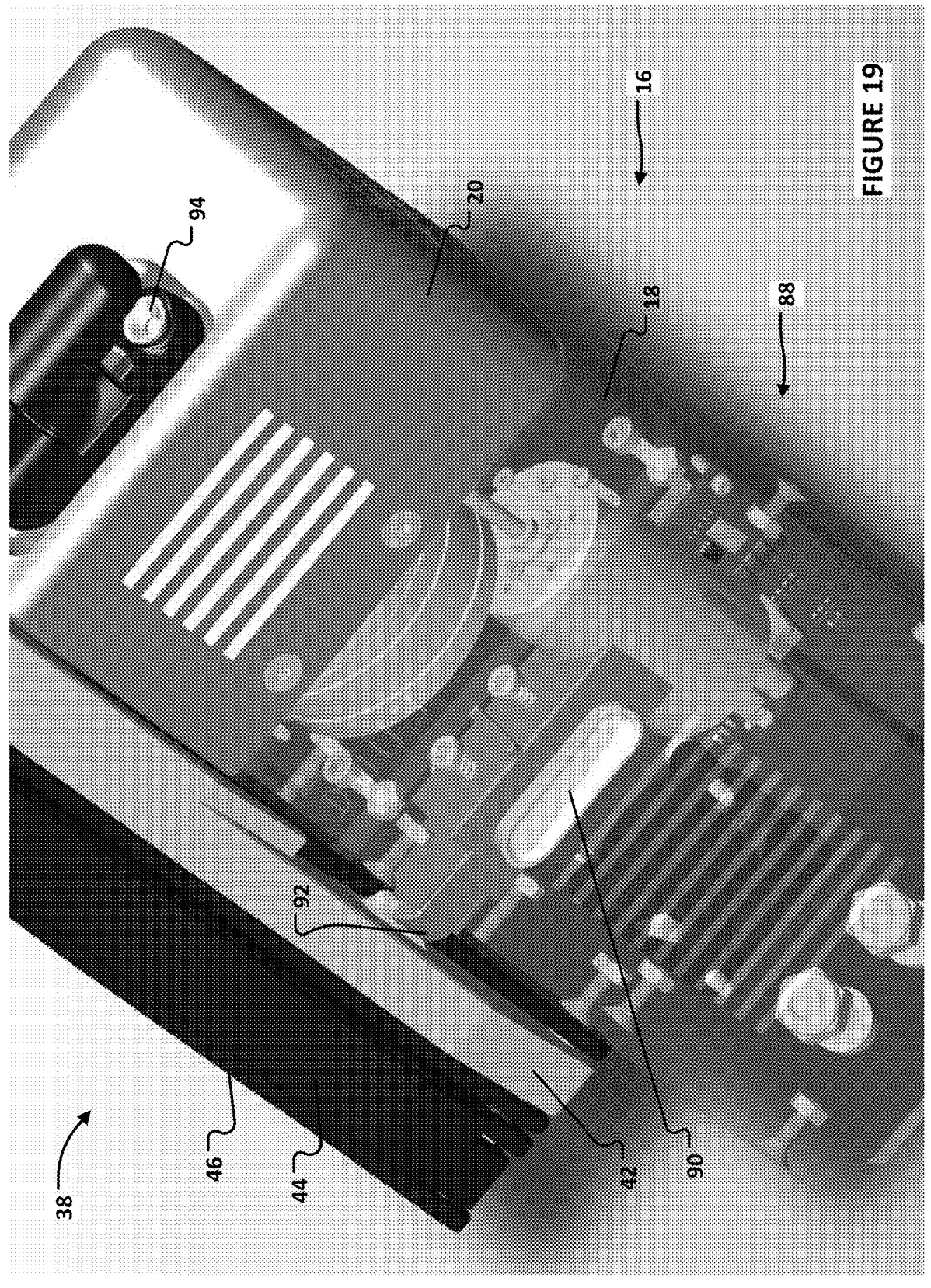
FIG. 19 is an isometric view of the apparatus shown in FIGS. 1-14 wherein the base has been made transparent.

Referring now to FIG. 19, the exemplary apparatus 10 also includes an exemplary lock 88 that is selectively engageable and operably disposed between the exemplary base 16 and the exemplary linkage 38. In FIG. 19, the exemplary first portion 18 of the exemplary base 16 has been made transparent. The exemplary lock 88 prevents relative movement between the exemplary base 16 and at least a portion of the linkage 38 when the linkage 38 has been folded into a stowed configuration, such as shown in FIG. 10. The exemplary lock 88 includes a slider button 90 on the face of the exemplary first portion 18 that can be moved laterally by a user. The exemplary lock 88 also includes a latch 92 fixed for movement with the exemplary slider button 90 so that the user moves the exemplary latch 92 away from the exemplary linkage 38 by moving the exemplary slider button 90. FIG. 19 shows the exemplary latch 92 in the locking position. The exemplary latch 92 can be moved away from the exemplary linkage 38 to release the exemplary linkage 38. The exemplary lock 88 can also include a spring (not shown) to bias the exemplary slider button 90 and exemplary latch 92 to the locking position.

Referring now to FIGS. 20A-20D, the exemplary apparatus 10 also includes an exemplary lock 96 that is selectively engageable and operably disposed between the exemplary third link 44 and the exemplary fourth link 46. When engaged, the exemplary lock 96 limits an angle 98 between the exemplary third link 44 and the exemplary fourth link 46 to less than one hundred and eighty degrees. This prevents a concentricity of axes 50, 54 and a singularity from occurring during use of the apparatus 10, but allows for singularity when the apparatus is to be stored. In the present disclosure, a singularity refers to a configuration of the linkage 38 with ill-posed properties wherein the linkage 38 loses one or more of its degrees of freedom. A concentricity refers to the axes 50, 54 being colinear.

Figure 11:
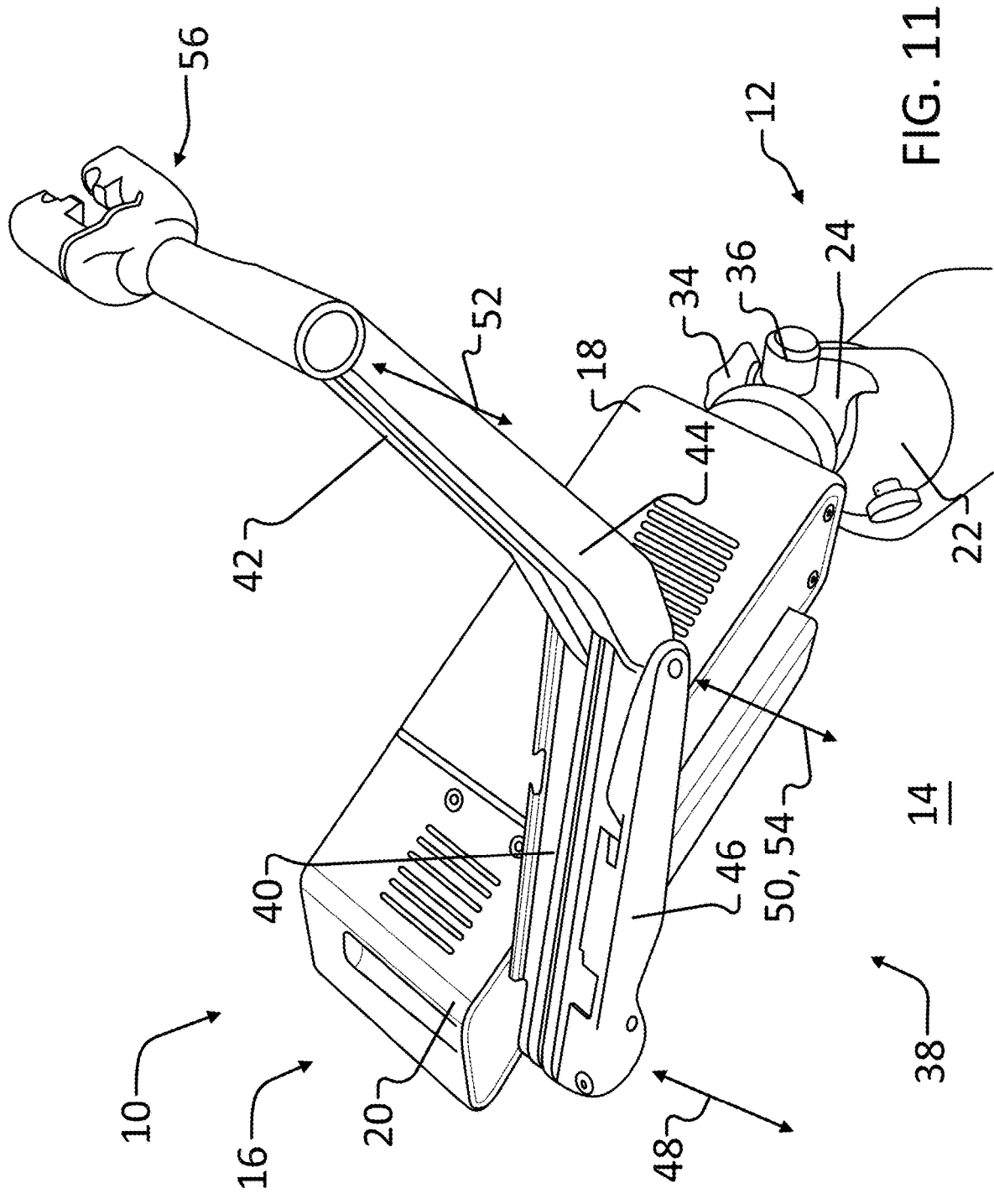
FIG. 11 is a sixth isometric view of the apparatus shown in FIGS. 1-10 wherein the orientation of the links of the linkage of the apparatus relative to the base of the apparatus has been changed relative to the respective orientations shown in FIGS. 1-9 and FIG. 10.
Figure 12:
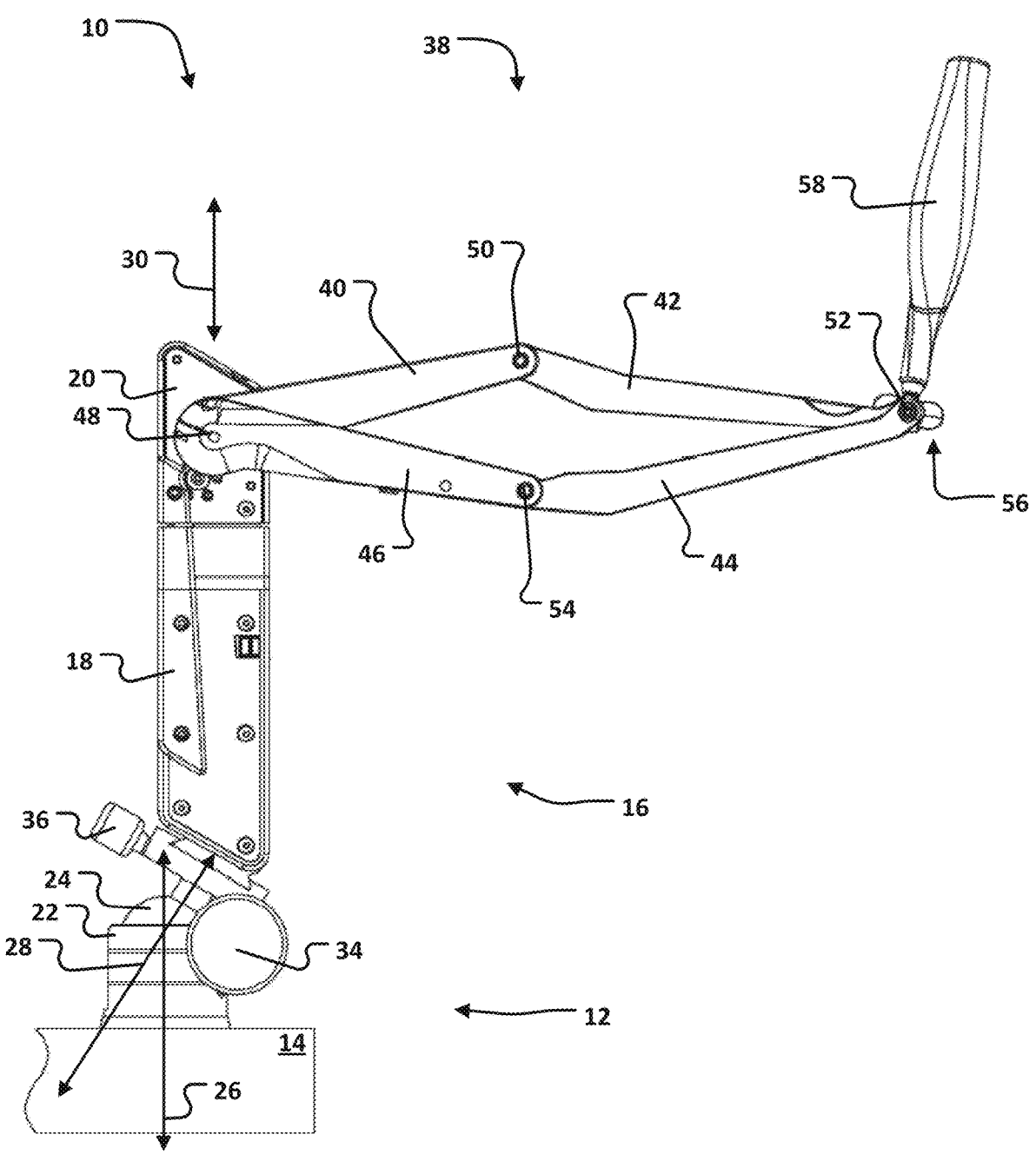
FIG. 12 is an orthogonal left-side view of the apparatus shown in FIGS. 1-11 wherein the orientation of the links of the linkage of the apparatus relative to the base of the apparatus has been changed relative to the respective orientations shown in FIGS. 1-9, FIG. 10, and FIG. 11.
Figure 13:
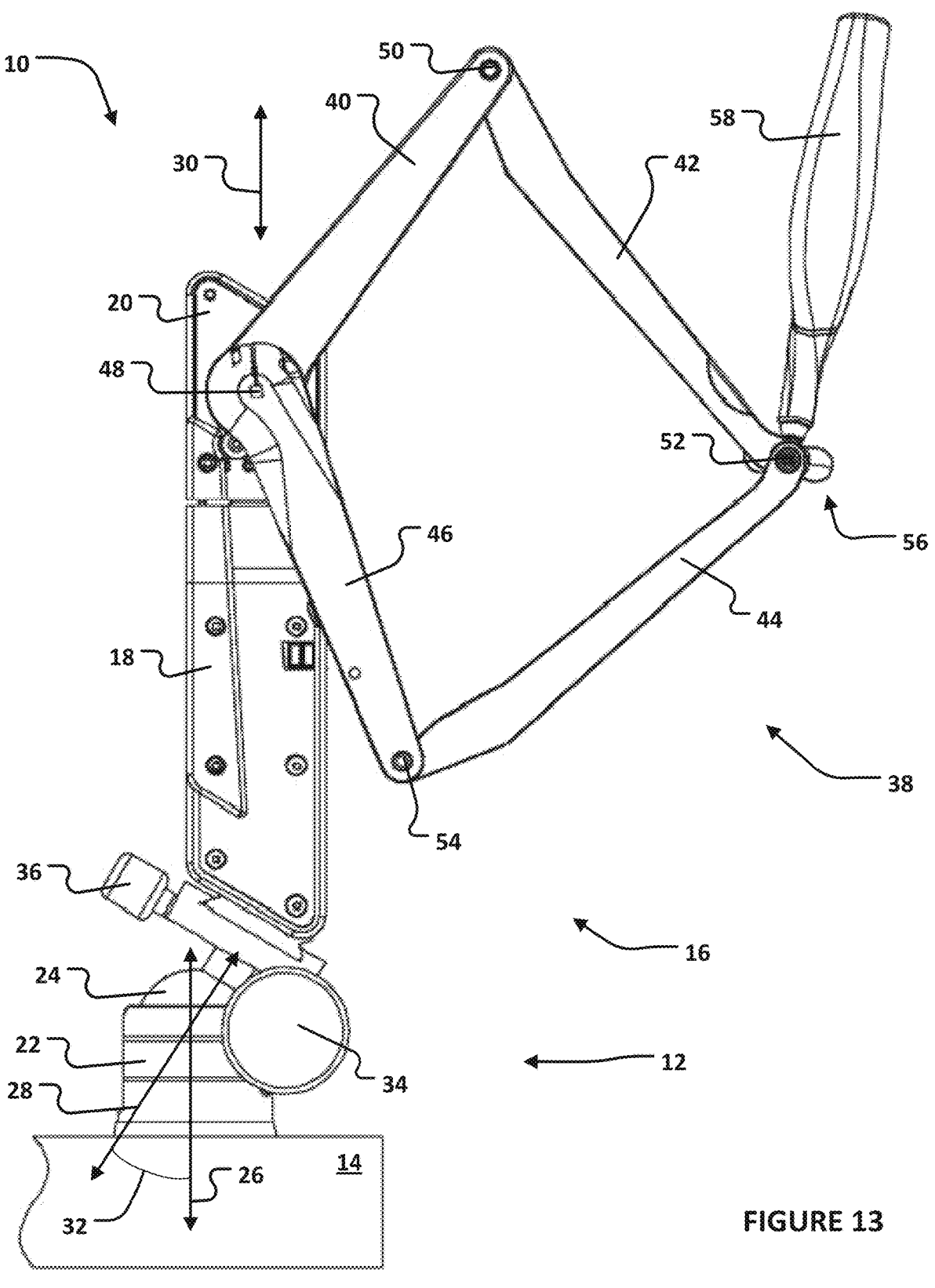
FIG. 13 is an orthogonal left-side view of the apparatus shown in FIGS. 1-12 wherein the orientation of the links of the linkage of the apparatus relative to the base of the apparatus has been changed relative to the respective orientations shown in FIGS. 1-9, FIG. 10, FIG. 11, and FIG. 12.
Figures 20A, 20B, 20C, 20D:
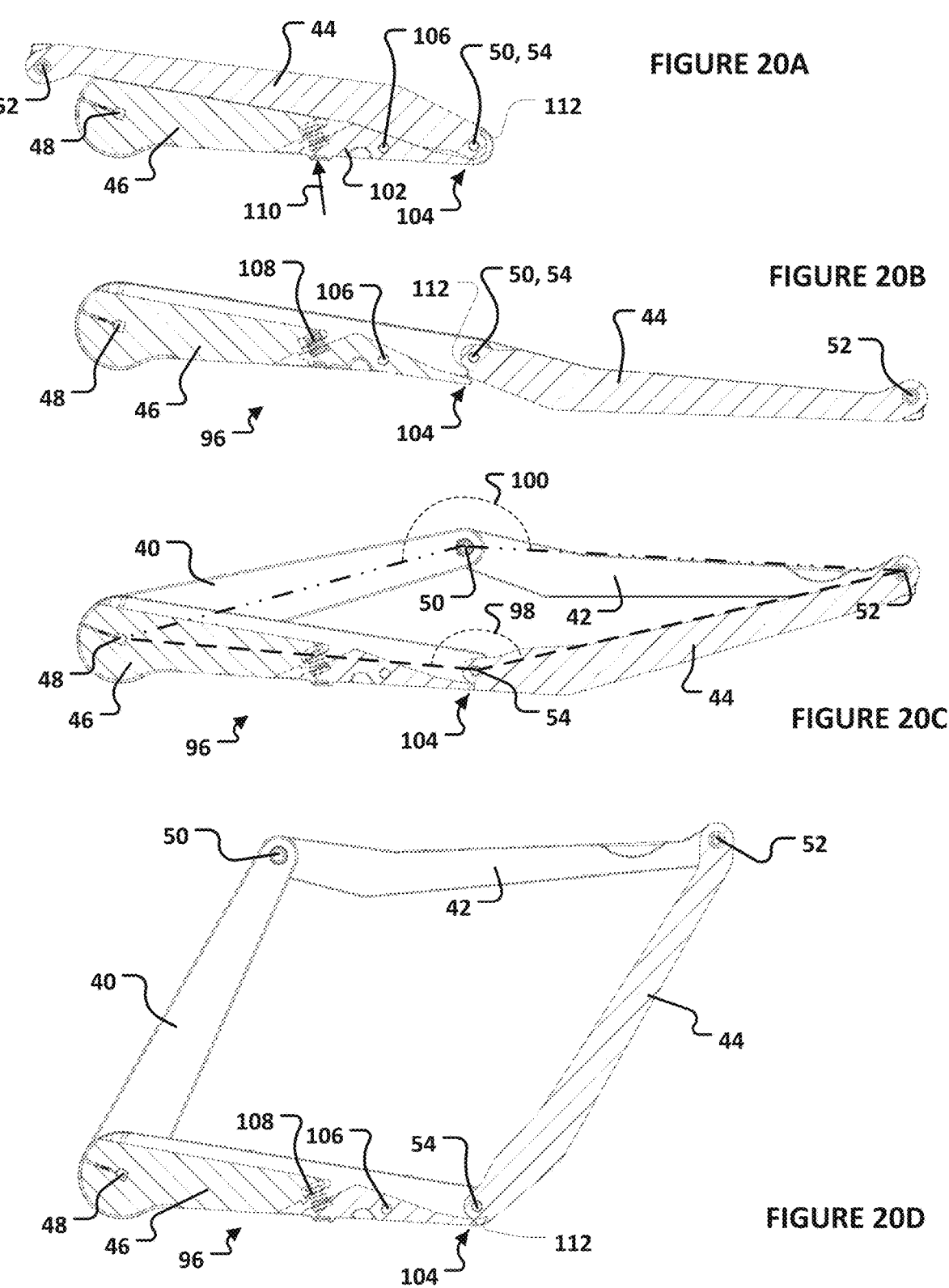
FIG. 20A is a first cross-section through two of the links of the linkage in the plane 20A-20A referenced in FIG. 9.
FIG. 20B is a second cross-section through the two links of the linkage in the plane 20B-20B referenced in FIG. 9 wherein the two links are in a different orientation relative to one another than shown in FIG. 20A.
FIG. 20C is a third cross-section through the two links of the linkage in the plane 20C-20C referenced in FIG. 9 wherein the two links are in a different orientation relative to one another than shown in FIG. 20B.
FIG. 20D is a fourth cross-section through the two links of the linkage in the plane 20D-20D referenced in FIG. 9 wherein the two links are in a different orientation relative to one another than shown in FIG. 20D.
Figure 21:
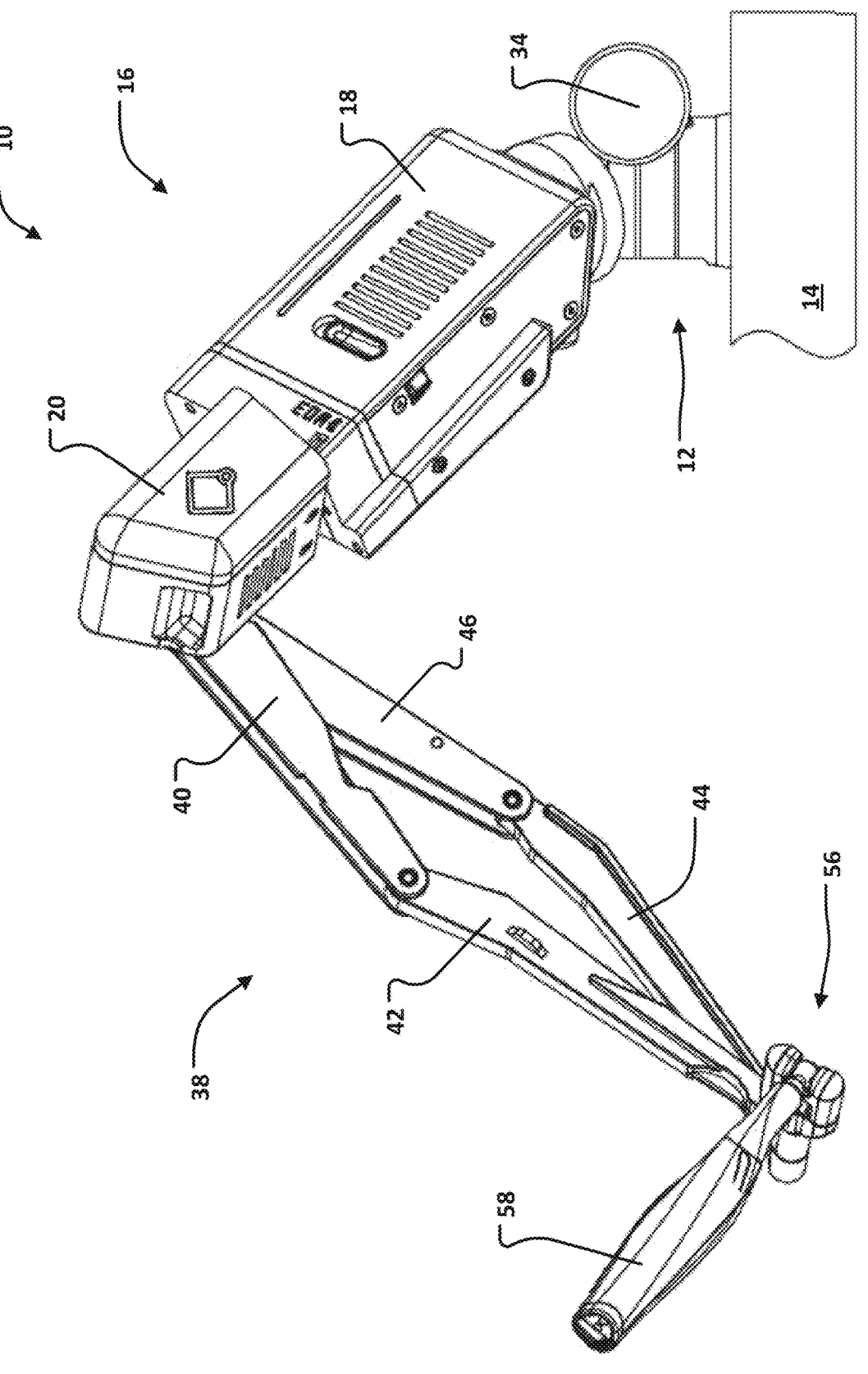
FIG. 21 is a seventh isometric view of the apparatus shown in FIGS. 1-20D wherein an orientation of the base of the apparatus relative to a mount of the apparatus has been changed relative to the orientation shown in FIGS. 1-9, an orientation of the links of a linkage of the apparatus relative to the base of the apparatus has been changed relative to the orientations shown in other Figures, and a head portion of the base has been rotated relative to a body portion of the base.
Figure 22:
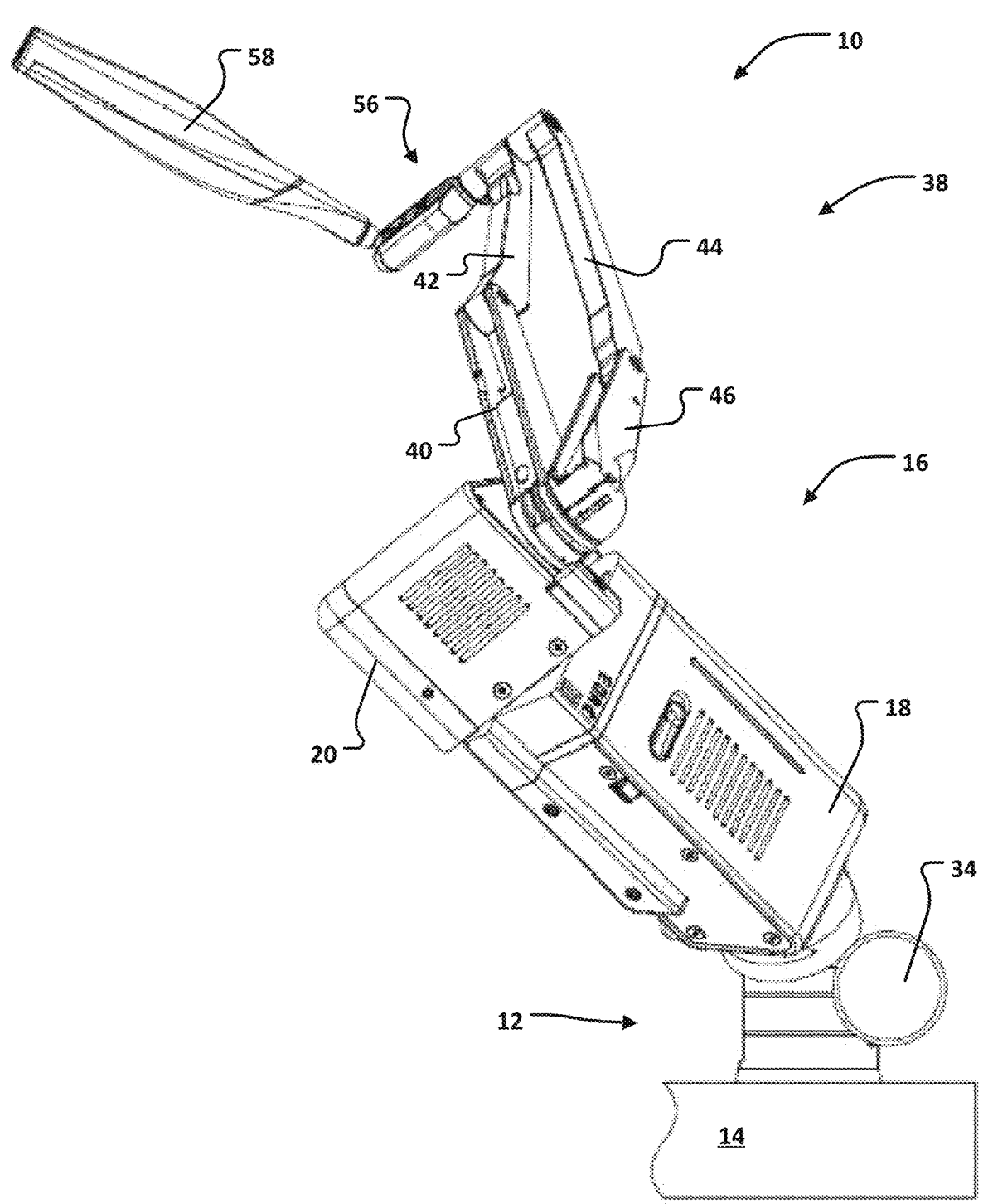
FIG. 22 is an eighth isometric view of the apparatus shown in FIGS. 1-21 wherein an orientation of the base of the apparatus relative to a mount of the apparatus has been changed relative to the orientation shown in FIGS. 1-9, an orientation of the links of a linkage of the apparatus relative to the base of the apparatus has been changed relative to the orientations shown in other Figures, and the head portion of the base has been rotated relative to a body portion of the base.

The exemplary first link 40 and the exemplary second link 42 are engaged with the exemplary third link 44 and the exemplary fourth link 46 such that the exemplary lock 96, when engaged between the exemplary third link 44 and the exemplary fourth link 46, can also limit an angle 100 between the exemplary first link 40 and the exemplary second link 42 to less than one hundred and eighty degrees. FIG. 20A corresponds to the links 40-46 in the stowed orientation. FIG. 10 shows the links 40-46 in the stowed orientation. When the links 40-46 are initially extended for use from the stowed orientation (after being released by unlocking the lock 88), the first and fourth links 40, 46 move parallel to one another and the second and third links 42, 44 move parallel to one another, as best shown in FIG. 11. In other words, the links 40, 46 extend symmetrically to one another and the links 42, 44 extend symmetrically to one another. Also, the axes 50, 54 are concentric. The respective pairs of links 40, 46 and 42, 44 maintain a parallel orientation during extending movement up to point when the first and second links 40, 42 and the third and fourth links 44, 46 are substantially one hundred and eighty degrees relative to one another, as shown in FIG. 20B.

In the exemplary embodiment of the present disclosure, the links 40, 46 are the same length. The exemplary links 42, 44 are the same length. The exemplary links 42, 44 are longer than the exemplary links 40, 46. The links 42, 44 can be five to thirty-five percent longer than the exemplary links 40, 46, ten to twenty-five percent longer, or twelve to fifteen percent longer. These exemplary, relative sizes among the links can enhance portability of the apparatus 10.

The exemplary lock 96 includes an exemplary stop 102 having an exemplary distal tip 104. The exemplary stop 102 is pivotally mounted on the exemplary fourth link 46 about a pivot axis 106 for pivoting movement between an operating position and a retracted position. The exemplary stop 102 is shown in the operating position in FIGS. 20A, 20C, and 20D. The exemplary stop 102 is shown in the retracted position in FIG. 20B. It is noted that the exemplary lock 96 could be mounted to any of the links 40-46.

The exemplary lock 96 includes an exemplary biasing device 108 mounted on the exemplary fourth link 46. The exemplary biasing device 108 biases the exemplary stop 102 to the operating position. A user can unlock the exemplary lock 96 by pressing the exemplary stop 102 in a direction referenced at 110. When the stop 102 is pressed, there is spring-loaded resistance provided by the biasing device 108, which prevents unwanted or accidental presses but also provides a more robust stop 102. It is noted that alternatives to biasing device 108 could be applied in other embodiments of the present disclosure. For example, one or more magnets could be mounted on one or more of the links 40-46 and arranged so that, upon the links 40-46 reaching the configuration shown in FIG. 20B, the magnets would urge the links 40 and 42 into the configuration shown in FIG. 20C.

The exemplary third link 44 includes an exemplary engaging surface 112 that comes into contact with the exemplary distal tip 104 when the exemplary stop 102 is in the operating position and before the exemplary third link 44 and the exemplary fourth link 46 pivot to one hundred and eighty degrees relative to one another. The exemplary engaging surface 112 and the exemplary axis 50 are the same distance from the exemplary axis 48. The exemplary engaging surface 112 and the exemplary axis 50 are the same distance from the exemplary axis 52. As set forth above, FIG. 20A corresponds to the links 40-46 in the stowed orientation. FIG. 20B corresponds to the links 40-46 being pivoted out of the stowed orientation to the first and second links 40, 42 and the third and fourth links 44, 46 are substantially one hundred and eighty degrees relative to one another. Prior to configuration shown in FIG. 20B, the exemplary lock 96 was unlocked. In other words, the exemplary stop 102 was pivoted to the retracted position and the exemplary distal tip 104 was moved out of a path of movement of the exemplary engaging surface 112. Between FIGS. 20A and 20B, the exemplary engaging surface 112 has moved along an arcuate path about the collinear axes 50, 54 approximately one hundred and eighty degrees. Further, because the exemplary stop 102 has been pivoted to the retracted position, the exemplary third link 44 and the exemplary fourth link 46 are then operable to pivot to at least one hundred and eighty degrees relative to one another.

When the links 40-46 reach the configuration shown in FIG. 20B, the links 40 and 42 can be moved out of parallelism with the links 46 and 44, respectively. This is shown in FIG. 20C. When the exemplary lock 96 is disengaged relative to the exemplary third link 44 and the exemplary fourth link 46, the exemplary first link 40 and the exemplary second link 42 are pivotally moveable relative to one another such that the angle 100 can be greater than one hundred and eighty degrees. In the exemplary apparatus, after the links 40, 42 have been freed to pivot relative to one another greater than one hundred and eighty degrees, the lock 96 can be reengaged (applied pressure in the direction 110 removed) and the links 44 and 46 can be constrained to be less than one hundred and eighty degrees relative to one another, as shown in FIGS. 20C and 20D.

When it is desired to return the exemplary apparatus 10 to the stowed configuration, the links 40-46 can be returned to the configuration shown in FIG. 20B, the lock 96 can be unlocked, wherein the stop 102 is depressed and moved such that the distal tip 104 no longer prevents parallelism, and the links 40, 42 can be returned to parallelism with the links 46, 44, respectively. The lock 96 can then be reengaged and the links 40-46 moved to the positions shown in FIG. 10.

The exemplary links 40-46 define a five-bar linkage wherein the fifth bar has a zero length. The links 40 and 46 could be pivotal about different, spaced axes in other embodiments of the present disclosure. In such embodiments, the second or head portion 20 of the base 16 would function as the fifth bar or link. Thus, in the exemplary embodiment, the link 40 and the link 46 are both disposed for rotational movement about the axis 48, but in other embodiments could be disposed for rotational movement about respective, spaced axes.

This design of the exemplary linkage 38 prevents self-intersection and improves workspace size, as the exemplary links 40-46 are placed on the same side of the head portion 20 and thereby prevent them from colliding with the base 16 of the device. Additionally, this symmetry allows the links 40-46 to be generally similar in size, which improves portability when folded.

Figure 23:
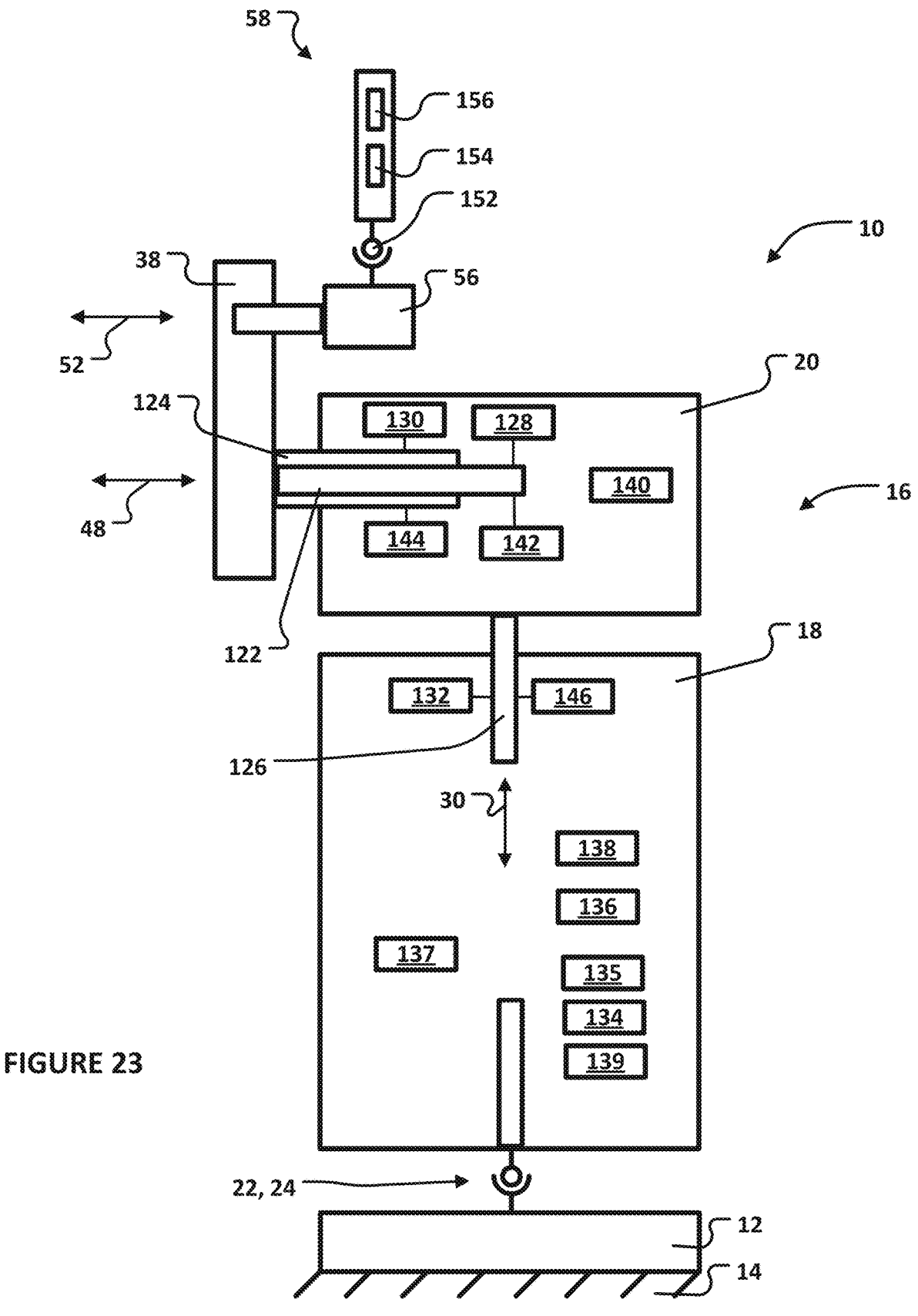
FIG. 23 is a schematic representation of the apparatus shown in FIGS. 1-22.

Referring now to FIG. 23, as shown schematically, the exemplary apparatus 10 also includes a first shaft 122 interconnecting the head 20 with the linkage 38. For example, the exemplary first shaft 122 can interconnect the head 20 with the link 46 so that the link 46 is rotatable about the axis 48. The exemplary apparatus 10 also includes a second shaft 124 interconnecting the head 20 with the linkage 38. For example, the exemplary second shaft 124 can interconnect the head 20 with the link 40 so that the link 40 is rotatable about the axis 48. The exemplary apparatus 10 also includes a third shaft 126 interconnecting the head 20 with the body 18. For example, the exemplary third shaft 126 can interconnect the head 20 with the body 18 so that the head 20 and the body 18 are rotatable relative to one another about the axis 30.

The exemplary apparatus 10 also includes the at least one linkage sensor disposed to sense an orientation of the linkage 38 relative to the base 16. In the exemplary embodiment, the exemplary apparatus 10 includes a first linkage sensor 128 disposed to sense the angular position of the first shaft 122 about the axis 48 and a second linkage sensor 130 disposed to sense the angular position of the second shaft 124 about the axis 48. The exemplary apparatus 10 also includes at least one base orientation sensor disposed to sense an orientation of the exemplary body portion 18 of the base 16 relative to a known fixed coordinate frame, such as coordinate frame 159 referenced in FIG. 39. The exemplary coordinate frame 159 is a "real-world" coordinate system. In the exemplary embodiment, the exemplary apparatus 10 includes a head orientation sensor 132 disposed to sense the angular position of the third shaft 126 about the axis 30 (the angular position of the head portion 20 relative to the base portion 18). The exemplary apparatus 10 also includes base orientation sensors disposed to sense the angular orientation of the body portion 18 with respect to a known fixed coordinate frame such as coordinate frame 159. Exemplary sensor 134 can be disposed to sense a roll of the body portion 18, exemplary sensor 135 can be disposed to sense a pitch of the body portion 18, and exemplary sensor 139 can be disposed to sense a pitch of the body portion 18.

It is also noted that, in the exemplary embodiment, the apparatus 10 includes a controller 136, a first transceiver 138, and second transceiver 140. The controller 136 can be an ARM processor, including but not limited to an ARM Cortex M4F. It is noted that other controllers could be utilized. The exemplary controller 136 and exemplary first transceiver 138 are positioned in the exemplary body portion 18. The exemplary second transceiver 140 is positioned in the exemplary head portion 20. The exemplary second transceiver 140 receives signals from the sensors 128, 130 which correspond to sensed conditions and transmits the signals to the exemplary first transceiver 138. The exemplary first transceiver 138 receives from the exemplary second transceiver 140 the signals generated by the sensors 128, 130 and transmits these signals to the exemplary controller 136. The exemplary first transceiver 138 also receives signals from the sensors 132, 134, 135, 139 which correspond to sensed conditions and transmits the signals to the exemplary controller 136. The exemplary transceivers 138, 140 can communicate wirelessly with one another and one or more batteries can be positioned in the head portion 20 and the base portion 18 to provide power to the sensors 128-135 and 139, transceivers 138, 140, and the controller 136. The exemplary controller 136 can also utilize the first transceiver 138 to communicate and receive communications from other devices. It is noted that in alternative embodiments of the present disclosure, wires can extend between the head portion 20 and the base portion 18 so that signals from the sensors 128-135 and 139 can be received by the exemplary controller 136 directly. In the exemplary embodiment of the present disclosure, the data generated by the exemplary sensors 128-135 and 139 can be utilized by the controller 136 to determine the location in three-dimensional space of the axes 50, 52, 54 and the position of the connecting portion 66 by solving geometric models.

The exemplary apparatus 10 also includes a first torque assembly 142 having a first motor and a first drive. A drive of a torque assembly can be defined by a cable or some other structure. The exemplary first torque assembly 142 is engaged with the first shaft 122 and operable to generate a variable amount of torque against rotation of the first shaft 122. The exemplary apparatus 10 also includes a second torque assembly 144 having a second motor and a second drive. The exemplary second torque assembly 144 is engaged with the second shaft 124 and operable to generate a variable amount of torque against rotation of the second shaft 124. The exemplary apparatus 10 also includes a third torque assembly 146 having a third motor and a third drive. The exemplary third torque assembly 146 is engaged with the third shaft 126 and operable to generate a variable amount of torque against rotation of the third shaft 126. The controller 136 receives respective signals from the head orientation sensor 132 and from the first linkage sensor 128 and from the second linkage sensor 130 and controls the respective operations of the motors of the torque assemblies 142, 144, 146 at least partially in response the respective signals, as will be described in greater detail below. This control provides haptic feedback to the user of the tool 58 and apparatus.

The exemplary tool 58 includes the spherical end 152 which is configured to be received in the exemplary connecting portion 66. The exemplary tool 58 also includes at least one tool sensor 154 configured to sense a position of the tool 58 in three-dimensional space and/or an orientation of the tool 58. The exemplary tool 58 also includes a transceiver 156 disposed to receive signals from the tool sensor 154 and wirelessly transmit those signals to another device. The exemplary tool 58 can thus be tracked wirelessly, without being limited by the constraints of a physical connection to the apparatus 10 which can lead to parasitic haptic forces that impede simulation. This allows for more flexibility in the types of operating environments in which the apparatus 10 can be utilized, allowing for an immersive simulation with or without force feedback. The wireless tool 58 with device orientation sensing also allows for quick connection and disconnection from the apparatus 10 to facilitate quick tool swapping and reduce wire wind-up or breakage.

Referring now to FIG. 39, one or more embodiments of the present disclosure include components operable to track/determine the position and orientation of the apparatus in three-dimensional space. Such a combination is referred to herein as a "console" and can be viewed as a form of a system. The exemplary console 157 shown in FIG. 39 includes the apparatus 10, the tool 58, a central unit 158, cameras 160, 162, and a display 164. The exemplary central unit 158 is a computing device with one or more processors and memory storing logic/instructions executable by the one or more processors for performing computing operations. The exemplary central unit 158 could include any number processors and exemplary processors that could be utilized in the exemplary central unit 158 include, but are not limited to, the ARM, ARM64, x86 or x64 architectures, AMD Ryzen 3 1200 or Intel i5-4460. A central processing unit ("CPU") and a graphics processing unit ("GPU") could be utilized, such as an Intel Core 19-11900K central processor and a NVIDIA RTX3070 graphics processor. The exemplary central unit 158 can control the display 164 to display a virtual environment, an augmented environment, or an actual environment that is physically proximate or is remote from the system. The exemplary central unit 158 can communicate with the exemplary plurality of cameras 160, 162 to receive signals generated by the exemplary plurality of cameras, such as video signals. An exemplary coordinate frame of the console 157 is referenced at 159. An exemplary coordinate frame of the apparatus 10 is referenced at 161. An exemplary coordinate frame of the simulation environment displayed by the display 164 is referenced at 163.

The exemplary cameras 160, 162 are directed at the exemplary apparatus 10 and generate video signals that can be utilized by the central unit 158 to determine one or both of (i) the position of the apparatus 10 according to a fixed coordinate frame of three-dimensional space that is occupied by the apparatus 10 (hereafter the "absolute position") and/or (ii) the angle between a central longitudinal axis of said apparatus 10 and the vertical axis which defines the orientation of the apparatus 10 relative to rotation in the fixed coordinate frame of three-dimensional space (hereafter the "absolute orientation"). The console 157 may or may not occupy the three-dimensional space with the apparatus 10. In the exemplary embodiment, the central unit 158 can determine both from the signals received from the cameras 160, 162. The cameras 160, 162 can thus define exemplary body sensors that are disposed to sense conditions associated with the position of the apparatus 10 and a rotational orientation of the apparatus 10 relative to the fixed coordinate frame.

As set forth above, the apparatus 10 includes exemplary torque assemblies 142-146 that can apply variable levels of torque to the shafts 122-126 in order to inhibit the respective rotations of the shafts 122-126 and thereby produce a composite resistance to the movement of the connecting portion 66. This composite resistance, in turn, is perceived by the user as force feedback. The extent of the resistance to movement can be viewed as a force vector applied at the connecting portion 66. The direction of the force vector that is to be applied is dependent at least in part on the absolute position and the absolute orientation. In the exemplary embodiment, the central unit 158 can determine the absolute position and the absolute orientation of the apparatus 10 and can also communicate the absolute position and the absolute orientation to the apparatus 10. In turn, the apparatus 10 can generate the force vector at the connecting portion in response to the absolute position and the absolute orientation received from the central unit 158. It is noted that the direction of the force vector can also be dependent on the orientation of objects displayed by the display 164.

The paragraphs immediately above disclose one approach for "body frame tracking" wherein the body frame is the body portion 18. Other approaches to body frame tracking are contemplated by the present disclosure. FIG. 40A is a schematic representation of a first console scheme applying inside-out tracking. The boxes designated "Environment" and "Signal Broadcaster" represent sources that can generate a signal that can be sensed. The Environment box represents types of signals arising naturally, such as light. The Signal Broadcaster box represents a device that can generate a signal. By way of example and not limitation, a Signal Broadcaster could be one or more light emitting diodes (LEDs) that can be mounted on the body portion 16. In another embodiment, one or more reflectors could be mounted on the body portion 18 and the LEDs can be arranged to direct light that is deflected off of such reflectors. In another embodiment, a Signal Broadcaster could emit sound waves.

The switch shown in FIG. 40A represents that either kind of signal source can be utilized in an operating environment of the present disclosure. It is noted that in one or more embodiments of the present disclosure, both kinds of signal source can be utilized.

FIG. 40A also discloses that the signal(s) produced by the one or more signal sources are received (sensed) by a Body Sensor. The cameras 160, 162 are examples of Body Sensors. The nature of the Body Sensor applied in any particular embodiment of the present disclosure can correspond to the nature of the signal source.

It is noted that the console 157 is one example of the box designated Haptic Console in FIG. 40A. Thus, a Haptic Console need not be a single physical structure or assembly, but can be defined by a plurality of components that are physically spaced from one another.

FIG. 40A also discloses that signals, generated by the Body Sensor and that correspond to sensed conditions, are transmitted to a CPU. The exemplary CPU is configured to receive signals from the Body Sensor that correspond to sensed conditions. The exemplary CPU is also configured to determine, in response to the signals received from the Body Sensor, the absolute position and the absolute orientation of the apparatus 10.

FIG. 40A also discloses that the exemplary CPU is configured to communicate the absolute position and the absolute orientation to the apparatus 10. The Device box corresponds to the apparatus 10. The apparatus 10 can apply the data received from the CPU to alter the levels of torque applied to one or more of the shafts 122-126 and thereby change the force vector at the connecting portion 66.

FIG. 40A also discloses a feedback loop in that, in one or more embodiments of the present disclosure, the apparatus 10 can transmit a signal to the Signal Broadcaster to modify the signal emitted by the Signal Broadcaster. For example, the apparatus 10 may include an Inertial Measurement Unit ("IMU") 137 (referenced in FIG. 23) within the body portion 16. This IMU 137 can be operable to sense the absolute orientation. A controller within the apparatus 10, such as exemplary controller 136 referenced in FIG. 23, can compare data generated by the internal IMU 137 with the absolute orientation data received from the CPU. In response to the comparison, the controller 136 of the apparatus 10 can transmit a signal to the Signal Broadcaster to modify the signal emitted by the Signal Broadcaster in order to minimize or eliminate and difference between the absolute orientation data sensed by the internal IMU 137 and the absolute orientation data received from the CPU.

FIG. 40B is a schematic representation of a second console scheme in which outside-in tracking is applied. The Signal Broadcaster is part of the Haptic Console while the Sensor is not. It is noted that any form of sensing can be applied in one or more embodiments of the present disclosure, such as, by way of example and not limitation, optical, fiducial, visible light, infrared light, stickers/reflectors, blinking lights, and sound.

Outside-in tracking solutions could be positioned in a way such that any cameras or magnetometer solutions were calibrated with respect to the coordinate frame of the simulation. The body portion 18 would then be tracked with respect to the outside-in tracking solution coordinate frame which would be known with respect to the simulation frame based on a known set-up configuration.

Outside-in tracking solutions provide both position and orientation data that facilitates the ability to move the apparatus 10 within the physical world and track changes in both position and orientation. This allows the coordinate frames corresponding to the force vector at the connecting portion 66 to be updated with respect to the simulation in real-time, allowing for rapid device reconfiguration and repositioning. In addition, an outside-in tracking solution that is preconfigured to align the simulation environment with respect to the real-world and apparatus 10 would facilitate rapid setup and teardown of a simulation further facilitating portability and ease-of-use. This preconfigured setup could be achieved by ensuring that the simulation is generated within a repeatable fixed location within the real-world environment with respect to the exteroceptive sensors that are used to track the object position.

One such outside-in embodiment could track several positions on the apparatus 10 using a camera and known positions fixed to the device. An light spectrum sensor, such as, but not limited to, a camera or infrared ("IR") sensor array, capable of tracking points on the apparatus 10 fixed relative to each other allows for the identification of position and orientation data of the body portion 18 which can then be transformed to coincide with displacements and rotations within the simulation frame. The tracked coordinates on the apparatus 10 could be identified using sensors or emitters such as, but not limited to, fiducial markers, nonvisible spectrum lights, or nonvisible spectrum blinking LEDS. Commercially available tracking solutions, such as the Lighthouse tracking system, made popular by HTC and Valve, are an example of such an embodiment. Another such commercially available solution is the Optitrack solution which uses reflective IR markers. These tracking solutions provide millimeter scale positional accuracy and precision tracking.

Visual occlusion can occur when a user or obstacle obstructs the line-of-sight between a tracked point on a body and the sensor detecting the tracked point. Solutions reliant on line-of-sight, such as optical based tracking techniques, require a significant number of trackable markers to make them robust against visual occlusion as it becomes more reliable to track a number of markers simultaneously as it is less likely to occlude a multitude of markers at once which causes the system to lose tracking.

Electromagnetic (EM) based tracking embodiments utilize the generation of a magnetic field at a specific frequency to detect the position and orientation of a sensor within the generated magnetic field. As a sensor with a coil is translated and rotated within a magnetic field it induces a current which can be detected and mapped to a corresponding position and orientation within the generated field with respect to the field source. Alignment of an associated coordinate frame of the magnetic field source with a coordinate frame attached to the simulation environment allow for tracking of a device body for real-time device reconfiguration within a force-feedback application.

Electromagnetic tracking provides a robust tracking solution against visual occlusion. However, EM tracking suffers from interference from materials that disrupt the electromagnetic fields generated by the signal source. In addition, EM tracking solutions are typically less accurate than optical based tracking approaches.

Hybrid tracking solutions that use a combination of the tracking techniques for physical simulation provide redundant state information about the tracked object. The redundant data can then be used with an algorithm, such as state-estimation prediction-correction algorithms, to improve tracking when transitioning between simulation interaction states where a preferred mode of tracking is required. The use of 100 Hz to 1000 Hz high throughput electromagnetic position and orientation data to provide prediction information about the position and orientation of the haptic force-feedback system. This data is useful for maintaining state information when the optically tracked components of the haptic force-feedback device is subjected to occlusion for sustained periods of time. The reintroduction of optical data, which with the current state-of-the-art provides more accurate absolute positional accuracy on the order of 1.0 mm with commercially available systems, can then be used to provide corrective data through a form of state-estimation filter such as, but not limited in scope to, an extended Kalman Filter or a Sigma Point Kalman filter. Sensor data from body inertial sensors, light spectrum based sensors, and electromagnetic sensors can be used in combination to provide robust position and orientation data that can reduce the number of required onboard visual markers from optical tracking solutions by 60% to 80% to track a rigid body with robust position and orientation tracking for physical simulation tasks.

FIG. 40C is a schematic representation of a third console scheme which is a hybrid of inside-out and outside-in.

It is noted that the embodiments of the present disclosure presented here are believed to provide uses of passive orientation and position sensing instrumentation to allow for a desktop haptic system to be reconfigured in real-time while the simulation is running. The real-time reconfiguration dynamically updates the position and orientation model in simulation so that the real-world coordinate system and the virtual environment coordinate systems, and thus the directionality of the experienced motions and applied forces and torques, remain synchronized. The updated workspace region can be displayed in real-time to the user within the virtual environment to enable the user to better reposition and reorient the apparatus 10 for a variety of simulation environments.

The orientation mechanisms by which the apparatus 10 can be reconfigured could include a passive ball joint mechanism to reconfigure the apparatus 10 in conjunction with an IMU that provides absolute or relative orientation data. The ball joint could be fixed in the desired position using a clamping mechanism to fix the revolute joint when the desired configuration is reached. A series of revolute joints and prismatic joints could also be used in conjunction with sensors and encoders that enable the precise position and orientation of the apparatus 10 coordinate frame to be determined relative to the simulation environment coordinate frame. The reconfigurable mechanism joints could also be motorized to reposition the apparatus 10 as it approaches a limit of the workspace or an ill-conditioned pose. These device actuations are different from the haptic force-feedback interactions from the virtual environment as any reconfiguration is intended to better situate the haptic system with respect to the virtual environment and not to display back forces from the virtual environment.

The exemplary apparatus 10 thus described includes a redundant revolute joint in series with a spherical joint (exemplary receiver assembly 56) that improves a range of motion for the user to avoid physical constraints. To allow the user to move hands around each other through a wide rotation of the wrist motion without coming in contact with any portion of the apparatus 10. Undesirable physical constraints, like the constraint of a hand-apparatus collision or tool 58-receiver assembly 56 collision are avoided by the redundant degree of freedom on the receiver assembly 56.

One or more embodiments of the present disclosure utilize a spherical joint, multi-staged gimbal, and a wireless handle (tool 58) to increase the region through which a user can orient and position their hand without entering into singularities, such as a "gimbal lock." Also, in one or more embodiments, a user can position the apparatus 10 without interference from wiring. Gimbal lock and interference from wiring break user immersion, degrade simulation realism, and degrade performance. To increase the range of possible motion beyond a standard ball joint, one or more embodiments of the present disclosure include an additional gimbal stage to allow for the ball joint (connecting portion 66) to pass through a wider range of motion without colliding with the physical constraints of the ball joint housing defined by the receiver assembly 56. This can be achieved by staging the singularity free ball joint with a robotic spherical wrist with aligned revolute axes.

One or more embodiments of the present disclosure provide a spherical joint multi-stage gimbal with quick instrumentation switching functionality and a wireless handle for increased portability, usability, and versatility in the art. This functionality was designed as a component of a general multi-stage gimbal assembly which attaches to the end of the device arms opposite the body of the device using redundant degrees-of-freedom to allow the user to orient and position their hand in a large workspace without limitation by mechanical constraints.

In the exemplary embodiment of the present disclosure, the connecting portion 66 defines a gimbal used as part of a quick tool change mechanism and utilizes a spherical joint that captures the ball tool tip of a wireless handle (tool 58) that allows the user to orient and position their hand in a large working region without being limited by ill-posed configurations, while also taking advantage of certain mechanical constraints to be able to change the tool without excessive application of force. This gimbal connector (the receiver assembly 56) allows for multi-instrument usage, which enhances the versatility of the apparatus 10 in applications including, but not limited to, simulations for surgery and medical practice. Alternative configurations of the connecting portion could include six-degree of freedom position and orientation tracking of the tool, dual ball joint connections for five-degree of freedom force feedback, or six-degree of freedom position and orientation tracking.

The exemplary linkage 38 defines a folding mechanism that works well for symmetric devices, as this allows the links 40-46 to be retracted in line with the base 16 of the apparatus 10 to increase portability. The fact that exemplary upper and lower links 40, 46 and 42, 44 are similar in length also helps improve portability by allowing for minimal protrusion when the links 40-46 are in a stowed position. Locking the linkage 38 with the lock 88 will keep the stowed links 40-46 fixed to the base 16, helping improve the safety of the apparatus 10 in transit and thus also enhance portability.

Referring now to FIGS. 25-31, according to a second exemplary embodiment of the present disclosure, an exemplary apparatus 10a for, by way of example and not limitation, augmented and virtual reality systems includes an exemplary mount 12a configured to releasably attach to an anchor structure, such as anchor structure 14. The exemplary mount 12a can include a clamp, one or more suction cups, or adhesive for releasably attaching to the exemplary anchor structure. Adhesive can take the form of microsuction tape or gecko tape.

The exemplary apparatus 10a also includes an exemplary base 16a that is movably engaged with the exemplary mount 12a. The exemplary base 16a includes a first portion 18a that can be referred to as a "body" of the base 16a and a second portion 20a that can be referred to as a "head" of the base 16a. The exemplary first portion 18a and exemplary second portion 20a are rotatable relative to one another about a second axis 30a.

The exemplary apparatus 10a also includes a linkage 38a movably engaged with the exemplary base 16a whereby an orientation of the linkage 38a relative to the exemplary base 16a is adjustable. The exemplary second portion 20a or head of the exemplary base 16a directly engages the linkage 38a. The exemplary linkage 38a is connected at the exemplary head portion 20a at two locations; the head portion 20a thus defines a fifth bar of non-zero length for the five-bar linkage 38a.

The exemplary linkage 38a includes a plurality of links including an exemplary first link 40a, an exemplary second link 42a, an exemplary third link 44a, and an exemplary fourth link 46a. The exemplary first link 40a and the exemplary fourth link 46a are directly engaged with the exemplary base 16a for pivoting movement about a third axis 48a. The exemplary first link 40a and the exemplary fourth link 46a can rotate about the third axis 48a relative to one another.

The exemplary first link 40a and the exemplary second link 42a are directly engaged with one another for relative pivoting movement about a fourth axis 50a. The exemplary second link 42a and the exemplary third link 44a are directly engaged with one another for relative pivoting movement about a fifth axis 52a. The exemplary third link 44a and the exemplary fourth link 46a are directly engaged with one another for relative pivoting movement about a sixth axis 54a. The exemplary first link 40a and the exemplary third link 44a are not directly engaged with one another for relative pivoting movement. The exemplary second link 42a and the exemplary fourth link 46a are not directly engaged with one another for relative pivoting movement. One or more of the plurality of links 40a, 42a, 44a, 46a can be at least partially transparent.

The exemplary apparatus 10a also includes an exemplary receiver assembly 56a having a body 60a movably engaged with the exemplary linkage 38a whereby an orientation of the body 60a relative to the exemplary linkage 38a is adjustable. The exemplary receiver assembly 56a is rotatable relative to the exemplary linkage 38a about the fifth axis 52a. The exemplary receiver assembly 56a can interconnect the apparatus 10a with a tool, such as tool 58a, that is grasped and moved by a user of the apparatus 10a while the user interacts with, by way of example and not limitation, an augmented or virtual reality environment. As the user moves the tool 58a, angularly and rectilinearly, the apparatus 10a can track the position of the tip of the tool 58a that is retained by the exemplary receiver assembly 56a. It is noted that in the exemplary embodiment, the tool 58a does not translate relative to the receiver assembly 56a, but the present disclosure is not limited by this relationship between the exemplary tool 58a and the exemplary receiver assembly 56a.

Referring now to FIGS. 32-38, according to a second exemplary embodiment of the present disclosure, an exemplary apparatus 10b for, by way of example and not limitation, augmented and virtual reality systems includes an exemplary mount 12b configured to releasably attach to an anchor structure, such as anchor structure 14. The exemplary mount 12b can include a clamp, one or more suction cups, or adhesive for releasably attaching to the exemplary anchor structure. Adhesive can take the form of microsuction tape or gecko tape.

The exemplary apparatus 10b also includes an exemplary base 16b that is movably engaged with the exemplary mount 12b. The exemplary base 16b includes a first portion 18b that can be referred to as a "body" of the base 16b and a second portion 20b that can be referred to as a "head" of the base 16b. The exemplary first portion 18b and exemplary second portion 20b are rotatable relative to one another about a second axis 30b.

The exemplary apparatus 10b also includes a linkage 38b movably engaged with the exemplary base 16b whereby an orientation of the linkage 38b relative to the exemplary base 16b is adjustable. The exemplary second portion 20b or head of the exemplary base 16b directly engages the linkage 38b. The exemplary linkage 38b includes a plurality of links including an exemplary first link 40b, an exemplary second link 42b, an exemplary third link 44b, and an exemplary fourth link 46b. The exemplary first link 40b and the exemplary fourth link 46b are directly engaged with the exemplary base 16b for pivoting movement about respective axes 48b and 49b. The exemplary links 40b and 46b are both separately connected at the exemplary head portion 20a; the head portion 20a thus defines a fifth bar of non-zero length for the five-bar linkage 38a.

The exemplary first link 40b and the exemplary second link 42b are directly engaged with one another for relative pivoting movement about a fourth axis 50b. The exemplary second link 42b and the exemplary third link 44b are directly engaged with one another for relative pivoting movement about a fifth axis 52b. The exemplary third link 44b and the exemplary fourth link 46b are directly engaged with one another for relative pivoting movement about a sixth axis 54b. The exemplary first link 40b and the exemplary third link 44b are not directly engaged with one another for relative pivoting movement. The exemplary second link 42b and the exemplary fourth link 46b are not directly engaged with one another for relative pivoting movement. One or more of the plurality of links 40b, 42b, 44b, 46b can be at least partially transparent.

The exemplary apparatus 10b can also include a receiver assembly such as exemplary receiver assembly 56b and have a body movably engaged with the exemplary linkage 38b whereby an orientation of the body relative to the exemplary linkage 38b is adjustable. Such a receiver assembly would be rotatable relative to the exemplary linkage 38b about the fifth axis 52b. Such a receiver assembly could interconnect the apparatus 10b with a tool, such as tool 58b, that is grasped and moved by a user of the apparatus 10b while the user interacts with, by way of example and not limitation, an augmented or virtual reality environment. As the user moves the tool, angularly and rectilinearly, the apparatus 10b can track the position of the tip of the tool that is retained by the receiver assembly.

While the present disclosure has been described with reference to three exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed as the only modes contemplated for carrying out this present disclosure, but that the present disclosure will include embodiments not disclosed but falling within the scope of the appended claims and any claims of any divisional or continuation application. The right to claim sub-elements, sub-components, and/or sub-combinations that are disclosed herein is hereby unconditionally reserved. The console/system described above may be claimed and the tool may claimed without the apparatus. The apparatus and the tool may be claimed as a combination without other components of the console/system. The apparatus and disclosed components other than the tool may be claimed as a combination. Subcomponents of the apparatus may be claimed without other components of the apparatus. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. An apparatus comprising:
   a mount configured to releasably attach to an anchor structure;
   a base being one of fixedly engaged and movably engaged with said mount;
   a linkage movably engaged with said base whereby a first orientation of said linkage relative to said base is adjustable;
   at least one linkage sensor disposed to sense the first orientation of said linkage relative to said base; and
   a receiver assembly having one of a male and female connecting portion for releasably receiving a tool;
   wherein said linkage is rotatable about a first axis and further comprises a plurality of links; and
   wherein said one of the male and female connecting portion is offset from said linkage such that a plane containing at least two of said plurality of links and normal to said first axis and closest to said one of the male and female connecting portion is at least thirty millimeters from a center of said one of the male and female connecting portion.

2. An apparatus comprising:
   a mount configured to releasably attach to an anchor structure;
   a base being one of fixedly engaged and movably engaged with said mount;
   a linkage movably engaged with said base whereby a first orientation of said linkage relative to said base is adjustable;
   at least one linkage sensor disposed to sense the first orientation of said linkage relative to said base;
   a receiver assembly having one of a male and female connecting portion; and a tool releasably receivable in said one of the male and
  female connecting portion wherein the tool further
  comprises:
a spherical end configured to be received in said one of the
  male and female connecting portion;
at least one tool sensor configured to sense at least one of
  a position of said tool and an orientation of said tool;
  and
a transceiver disposed to receive signals from said at least
  one tool sensor and wirelessly transmit said at least one
  of the position of said tool and the orientation of said
  tool.

* * * * *